US00RE43051E

(19) United States
(12) Reissued Patent
Newman et al.

(10) Patent Number: US RE43,051 E
(45) Date of Reissued Patent: Dec. 27, 2011

(54) ENABLING A SERVICE PROVIDER TO PROVIDE INTRANET SERVICES

(75) Inventors: Peter Newman, Mountain View, CA (US); Pawan Goyal, Mountain View, CA (US)

(73) Assignee: Digital Asset Enterprises, L.L.C., Wilmington, DE (US)

(21) Appl. No.: 11/858,091

(22) Filed: Sep. 19, 2007 (Under 37 CFR 1.47)

Related U.S. Patent Documents

Reissue of:
(64) Patent No.: 6,948,003
Issued: Sep. 20, 2005
Appl. No.: 09/526,980
Filed: Mar. 15, 2000

(51) Int. Cl.
*G06F 15/173* (2006.01)

(52) U.S. Cl. ..... 709/250

(58) Field of Classification Search ..... 709/250, 709/238, 245, 223, 217, 220, 203, 249; 370/349, 370/351; 455/433
See application file for complete search history.

(56) References Cited

U.S. PATENT DOCUMENTS

| | | | |
|---|---|---|---|
| 3,377,624 | A | 4/1968 | Nelson et al. |
| 4,177,510 | A | 12/1979 | Appell et al. |
| 5,189,667 | A | 2/1993 | Esaki et al. |
| 5,212,793 | A | 5/1993 | Donica et al. |
| 5,226,160 | A | 7/1993 | Waldron et al. |
| 5,249,290 | A | 9/1993 | Heizer |
| 5,263,147 | A | 11/1993 | Francisco et al. |
| 5,325,530 | A | 6/1994 | Mohrmann |
| 5,437,032 | A | 7/1995 | Wolf et al. |
| 5,528,753 | A | 6/1996 | Fortin |
| 5,572,680 | A | 11/1996 | Ikeda et al. |
| 5,584,023 | A | 12/1996 | Hsu |
| 5,603,020 | A | 2/1997 | Hashimoto et al. |
| 5,623,492 | A | 4/1997 | Teraslinna |
| 5,636,371 | A | 6/1997 | Yu |
| 5,640,595 | A | 6/1997 | Baugher et al. |
| 5,692,047 | A | 11/1997 | McManis |

(Continued)

FOREIGN PATENT DOCUMENTS

JP 64-002145 1/1989

(Continued)

OTHER PUBLICATIONS

Plummer, D. C., An Ethernet Address Resolution Protocol - or Converting Network Protocol Addresses to 48.bit Ethernet Address for Transmission on Ethernet Hardware, Nov. 1982, http://www.msg.net/kadow/answers/extras/rfc/rfc826.txt [retrieved from the Internet Jan. 17, 2000].

(Continued)

*Primary Examiner* — David Eng
(74) *Attorney, Agent, or Firm* — Perkins Coie LLP

(57) ABSTRACT

A method and system allows a service provider to provide Intranet services remotely by assigning private virtual servers to customers. Each customer addresses transmissions to one or more private virtual servers using private addresses from the customer's private Intranet. The addresses of different private virtual servers do not have to be unique and may overlap. Customers exchange privately-addressed transmissions with the service provider using tunnels to traverse the local or regional network connecting the customer with the service provider. The service provider routes the transmissions to the relevant private virtual server belonging to the customer that sent the transmission. The service provider also routes privately-addressed transmissions back to individual customers using tunnels.

8 Claims, 13 Drawing Sheets

U.S. PATENT DOCUMENTS 5,706,097 A 1/1998 Schelling et al.
5,706,453 A 1/1998 Cheng et al.
5,708,774 A 1/1998 Boden
5,719,854 A 2/1998 Choudhury et al.
5,727,203 A 3/1998 Hapner et al.
5,748,614 A 5/1998 Wallmeier
5,752,003 A 5/1998 Hart
5,761,477 A 6/1998 Wahbe et al.
5,764,889 A 6/1998 Ault et al.
5,781,550 A 7/1998 Templin et al.
5,799,173 A 8/1998 Gossler et al.
5,809,527 A 9/1998 Cooper et al.
5,828,893 A 10/1998 Wied et al.
5,838,686 A 11/1998 Ozkan
5,838,916 A 11/1998 Domenikos et al.
5,842,002 A 11/1998 Schnurer et al.
5,845,129 A 12/1998 Wendorf et al.
5,850,399 A 12/1998 Ganmukhi et al.
5,860,004 A 1/1999 Fowlow et al.
5,864,683 A 1/1999 Boebert et al.
5,889,956 A 3/1999 Hauser et al.
5,889,996 A 3/1999 Adams
5,892,968 A 4/1999 Iwasaki et al.
5,905,730 A 5/1999 Yang et al.
5,905,859 A 5/1999 Holloway et al.
5,913,024 A 6/1999 Green et al.
5,915,085 A 6/1999 Koved
5,915,095 A 6/1999 Miskowiec
5,918,018 A 6/1999 Gooderum et al.
5,920,699 A 7/1999 Bare
5,933,603 A 8/1999 Vahalia et al.
5,937,159 A 8/1999 Meyers et al.
5,956,481 A 9/1999 Walsh et al.
5,978,373 A 11/1999 Hoff et al.
5,982,748 A 11/1999 Yin et al.
5,987,524 A 11/1999 Yoshida et al.
5,991,812 A 11/1999 Srinivasan
5,999,963 A 12/1999 Bruno et al.
6,016,318 A 1/2000 Tomoike et al.
6,018,527 A 1/2000 Yin et al.
6,023,721 A 2/2000 Cummings
6,038,608 A 3/2000 Katsumata et al.
6,038,609 A 3/2000 Geulen et al.
6,047,325 A 4/2000 Jain et al.
6,055,617 A 4/2000 Kingsbury
6,061,349 A 5/2000 Coile et al.
6,065,118 A 5/2000 Bull et al.
6,075,791 A 6/2000 Chiussi et al.
6,075,938 A 6/2000 Bugnion et al.
6,078,929 A 6/2000 Rao et al.
6,078,957 A 6/2000 Adelman et al.
6,086,623 A 7/2000 Broome et al.
6,092,178 A 7/2000 Jindal et al.
6,094,674 A 7/2000 Hattori et al.
6,101,543 A 8/2000 Alden et al.
6,108,701 A 8/2000 Davies et al.
6,108,759 A 8/2000 Orcutt et al.
6,122,673 A 9/2000 Basak et al.
6,154,776 A 11/2000 Martin et al.
6,154,778 A 11/2000 Koistinen et al.
6,161,139 A 12/2000 Win et al.
6,167,520 A 12/2000 Touboul et al.
6,172,981 B1 1/2001 Cox et al.
6,189,046 B1 2/2001 Moore et al.
6,192,389 B1 2/2001 Ault et al.
6,192,512 B1 2/2001 Chess
6,230,203 B1 5/2001 Koperda et al.
6,240,463 B1 5/2001 Benmohamed et al.
6,247,057 B1 6/2001 Barrera, III
6,259,699 B1 7/2001 Opalka et al.
6,266,678 B1 7/2001 McDevitt et al.
6,269,404 B1 7/2001 Hart et al.
6,279,039 B1 8/2001 Bhat et al.
6,279,040 B1 8/2001 Ma et al.
6,282,581 B1 8/2001 Moore et al.
6,282,703 B1 8/2001 Meth et al.
6,286,047 B1 9/2001 Ramanathan et al.
6,298,479 B1 10/2001 Chessin et al.
6,314,558 B1 11/2001 Angel et al.
6,327,622 B1 12/2001 Jindal et al.
6,336,138 B1 1/2002 Caswell et al.
6,351,775 B1 2/2002 Yu
6,353,616 B1 3/2002 Elwalid et al.
6,363,053 B1 3/2002 Schuster et al.
6,370,583 B1 4/2002 Fishler et al.
6,381,228 B1 4/2002 Prieto, Jr. et al.
6,385,638 B1 5/2002 Baker-Harvey
6,389,448 B1 5/2002 Primak et al.
6,393,484 B1 5/2002 Massarani
6,425,003 B1 7/2002 Herzog et al.
6,430,622 B1 8/2002 Aiken, Jr. et al.
6,434,631 B1 8/2002 Bruno et al.
6,434,742 B1 8/2002 Koepele, Jr.
6,438,134 B1 8/2002 Chow et al.
6,442,164 B1 8/2002 Wu
6,457,008 B1 9/2002 Rhee et al.
6,463,459 B1 10/2002 Orr et al.
6,470,398 B1 10/2002 Zargham et al.
6,487,578 B2 11/2002 Ranganathan
6,487,663 B1 11/2002 Jaisimha et al.
6,490,670 B1 12/2002 Collins et al.
6,499,137 B1 12/2002 Hunt
6,529,950 B1 3/2003 Lumelsky et al.
6,529,985 B1 3/2003 Deianov
6,542,167 B1 4/2003 Darlet et al.
6,553,413 B1 4/2003 Leighton et al.
6,560,613 B1 5/2003 Gylfason
6,578,055 B1 6/2003 Hutchison et al.
6,578,068 B1 6/2003 Bowman-Amuah
6,580,721 B1 6/2003 Beshai et al.
6,625,650 B2 9/2003 Stelliga
6,647,422 B2 11/2003 Wesinger, Jr. et al.
6,658,571 B1 12/2003 O'Brien et al.
6,680,922 B1 * 1/2004 Jorgensen ..... 370/328
6,691,312 B1 2/2004 Sen et al.
6,711,607 B1 3/2004 Goyal
6,725,456 B1 4/2004 Bruno et al.
6,754,716 B1 6/2004 Sharma
6,760,775 B1 7/2004 Anerousis et al.
6,779,016 B1 8/2004 Aziz et al.
6,820,117 B1 11/2004 Johnson
6,976,258 B1 12/2005 Goyal
6,976,286 B1 12/2005 Goyal
6,982,984 B1 * 1/2006 Asayesh et al. ..... 370/401
7,061,899 B2 * 6/2006 Walker et al. ..... 370/351
7,111,163 B1 * 9/2006 Haney ..... 713/153
7,225,259 B2 * 5/2007 Ho et al. ..... 709/227
7,318,152 B2 * 1/2008 Haney ..... 713/153
7,441,043 B1 * 10/2008 Henry et al. ..... 709/238
7,653,074 B2 * 1/2010 Asayesh et al. ..... 370/401
7,672,288 B1 * 3/2010 Iartym ..... 370/349
2003/0061338 A1 3/2003 Stelliga

FOREIGN PATENT DOCUMENTS

JP 64002145 1/1989
WO WO 99/39261 8/1999
WO WO-9939261 8/1999

OTHER PUBLICATIONS

Huang, X. W. et al., "The Entrapid Protocol Development Environment," Proceedings of IEEE Infocom'99, Mar. 1999, 9 pages.
Duffield, N. G. et al., "A Flexible Model for Resource Management in Virtual Private Networks," Computer Communication Review Conference, Computer Communication, ACM SIGCOMM'99 Conference, Cambridge, MA, Aug. 30, 1999-Sep. 3, 1999, pp. 95-108.
Campbell, A. T. and S. Keshav, "Quality of Service in Distributed Systems," Computer Communications 21, 1998, pp. 291-293.
Bach, M.J., "The Design of the Unix® Operating System," New Delhi, Prentice-Hall of India, 1989, pp. v-x, 19-37.
McDougall, R. et al., "Resource Management,", Upper Saddle River, NJ, Prentice Hall, 1999, pp. iii-xix, 135-191.
Rijsinghani, A., RFC 1624, May 1994, http://www.faqs.org/rfcs/rfc1624.html, [retrieved from the internet Feb. 2, 2000].
Mallory, T. and Kullberg, A., RFC 1141, Jan. 1990, http://www.faqs.org/rfcs/rfc1141.html, [retrieved online Feb. 2, 2000].

Egevang, K. and P. Francis, "RFC 1631," May 1994, http://www.faqs.org/rfcs/rfc1631.html, [retrieved online Feb. 2, 2000].
Goyal, P. et al., "Start-time Fair Queuing: A Scheduling Algorithm for Integrated Services Packet Switching Networks," Proceedings of ACM SIGCOMM'96, San Francisco, CA, Aug. 1996, 14 pages.
Janosi, T., "Notes on 'A Hierarchical CPU Scheduler for Multimedia Operating Systems' by Pawan Goyal, Xingang Guo and Harrick Vin," http://cs.cornell.edu/Info/Courses/Spring-97/CS614/goy.html, [retrieved online May 8, 2000].
Goyal, P., "Packet Scheudling Algorithms for Integrated Services Networks," PhD Dissertation, Unviersity of Texas, Austin, TX, Aug. 1997.
Boehm, B., "Managing Software Productivity and Reuse," IEEE Computer, vol. 32, No. 9, Sep. 1999, 3 pages.
Corbato, F. J. et al., "An Experimental Timesharing System," Proceedings of the American Federation of Information Processing Societies Spring Joint Computer Conference, San Francisco, CA, May 1-3, 1962, pp. 335-344.
Deutsch, P. and C.A. Grant, "A Flexible Measurement Tool for Software Systems," Information Processing 71 [Proc. of the IFIP Congress], 1971, pp. 320-326.
Edjlali, G. et al., "History-based Access Control for Mobile Code," Fifth ACM Conference on Computer and Communication Security, Nov. 3-5, 1998, 19 pages.
Erlingsson, U. and Schneider, F. B., "SASI Enforcement of Security Policies: A Retrospective," Proc. New Security Paradigms Workshop, Apr. 2, 1999, pp. 1-17.
Erlingsson, U. and Schnieder, F. B., "IRM Enforcement of Java Stack Inspection," [online], Feb. 19, 2000, [retrieved on Apr. 2, 2002]. Retrieved from the Internet: http://cs-tr.cs.cornell.edu/Dienst/UI2.0/Show_Page/ncstrl.cornell/TR2000-1786.
Evans, D. and Twyman, A., "Flexible Policy-Directed Code Safety," Proc. of 1999 IEEE Symposium on Security and Privacy, Oakland, CA, May 9-12, 1999, pp. 1-14.
Fraser, T. et al., "Hardening COTS Software with Generic Software Wrappers," Proc. of 1999 IEEE Symposium on Security and Privacy, 1999, 15 pages.
Goldberg, I. et al., "A Secure Environment for Untrusted Helper Applications (Confining the Wily Hacker)," Proc. of the Sixth USENIX UNIX Security Symposium, San Jose, CA, Jul. 1996, 14 pages.
Goldberg, R. P., "Survey of Virtual Machine Research," IEEE Computer, Jun. 1974, pp. 34-45.
Pandey, R. and Hashii, B., "Providing Fine-Grained Access Control for Mobile Programs Through Binary Editing," Technical Report TR98 08, University of California, Davis, CA, 1998, pp. 1-22.
Ritchie, D. M., "The Evolution of the Unix Time-Sharing System," AT&T Bell Laboratories Technical Journal 63, No. 6, Part 2, Oct. 1984, (originally presented 1979), 11 pages.
Saltzer, J., H. and Schroeder, M. D., "The Protection of Information in Computer Systems," [online], 1973, [retrieved on Apr. 2, 2002]. Retrieved from the Internet: http://www.cs.virginia.edu~evans/cs551/saltzer/.
Wahbe, R. et al., "Efficient Software-Based Fault Isolation," Proc. of the Symposium on Operating System Principles, 1993, 14 pages.
Keshav, S., "*An Engineering Approach to Computer Networking: ATM Networks, the Internet, and the Telephone Network,*" Reading, MA, Addison-Wesley, 1997, pp. vii-xi, 85-115, 209-355, 395-444.
Stevens, R. W., "*UNIX Network Programming vol. 1 Networking APIs: Sockets and XTI,*" Upper Saddle River, NJ, Prentice Hall, 1998, pp. v-xiv, 29-53, 85-110, 727-760.
Tanenbaum, A. S. and Woodhull, A. S., "*Operating Systems: Design and Implementation,*" Upper Saddle River, NJ, Prentice Hall, 1997, pp. vii-xiv, 1-46, 401-454.
Rubini, A., "*LINUX Device Drivers,*" Sebastopol, CA, O'Reilly & Associates, Inc., 1998, pp. v-x, 13-40.
Goyal, P., et al., "A Hierarchical CPU Scheduler for Multimedia Operating Systems," *Proceedings of the Second Symposium on Operating Systems Design and Implementations* (OSDI'96), Seattle, WA, Oct. 1996, 15 pages.
Laurie, B. and Laurie, P., "*Apache the Definitive Guide,*" Sebastopol, CA, O'Reilly & Associates, Inc., Feb. 1999, pp. v-viii, 43-74.
Aho, A. V. and Ullman J. D., "*Principles of Complier Design,*" Reading, MA, 1977, pp. vii-x, 359-362, 519-522.
Jonsson, J., "Exploring the Importance of Preprocessing Operations in Real-Time Multiprocessor Scheduling," *Proc. of the IEEE Real-Time Systems Symposium—Work-in-Progress session,* San Francisco, CA, Dec. 4, 1997, pp. 31-34.
Rusling, D. A., "Processes," http://www.cebaf.gov/ saw/linux/tlk-html/node44.html> [retrieved online Dec. 7, 1999].
Rusling, D. A., "Linux Processes," http://www.cebatgov/~saw/linux/tlk-html/node45.html, [retrieved online Dec. 7, 1999].
Rusling, D. A., "Identifiers," http://www.ce-baf.gov/~saw/linux/tlk-html/node46.html, [retrieved online Dec. 7, 1999].
Rusling, D. A., "Scheduling," http://www.ce-baf.gov/~saw/linux/tlk-html/node47.html, [retrieved online Dec. 7, 1999].
Rusling, D. A., "Scheduling in Multiprocessor Systems," http://www.cebaf.gov/~saw/linux/tlk-html/node48.html, [retrieved online Dec. 7, 1999].
Rusling, D. A., "Files," http://www.cebaf.gov/~saw/linux/tlk-html/node49.html, [retrieved online Dec. 7, 1999].
Goyal, Pawan et al., "Generalized Guaranteed Rate Scheduling Algorithms: A Framework," IEEE/ACM Transactions on Networking, vol. 5, No. 4, Aug. 1997, pp. 561-571.
"Symbol Table," © 1997, 1998, [Retrieved online Apr. 4, 2003] http://216-239-33-100/search?q=cache:eASXK8qC__-AC:www.caldera.com/developers/gabi/1998-04-29/ch4.s..., pp. 1-5.
Mitra, Debasis et al., "Hierarchical Virtual Partitioning: Algorithms for Virtual Private Networking," Bell Labs Technical Journal, Spring, 1997, http://cm.bell-labs.com/cm/ms/who/mitra/paper/globe.ps.
U.S. Appl. No. 09/503,975, Goyal.
Plummer, D. C.,*An Ethernet Address Resolution Protocol—or—Converting Network Protocol Addresses to 48.bit Ethernet Address for Transmission on Ethernet Hardware,* Nov. 1982, [online], [retrieved on Jan. 17, 2000]. Retrieved from the Internet: <URL:http://www.msg.net/kadow/answers/extras/rfc/rfc826.txt>.
Rijsinghani, A., RFC 1624, May 1994, [online], [retrieved Feb. 2, 2000]. retrieved from the internet: <URL: http://www.faqs.org/rfcs/rfc1624.html>.
Mallory, T and Kullberg, A., RFC 1141, Jan. 1990 [online], [retrieved Feb. 2, 2000]. retrieved from the Internet: <URL: http://www.faqs.org/rfcs/rfc1141.html>.
Egevang, K. and Francis P., RFC 1631, May 1994 [online], [retrieved Feb. 2, 2000]. retrieved from the Internet: <URL: http://www.faqs.org/rfcs/rfc1631.html>.
Jánosi, T., "Notes on 'A Hierarchical CPU Scheduler for Multimedia Operating Systems' by Pawan Goyal, Xingang Guo and Harrick Vin," [online], [retrieved on May 8, 2000]. Retrieved from the internet: <URL: http://cs.cornell.edu/Info/Courses/Spring-97/CS614/goy.html>.
Pending U.S. Appl. No. 09/452,286, filed Nov. 30, 1999, entitled "Providing Quality of Service Guarantees to Virtual Hosts".
Pending U.S. Appl. No. 09/499,098, filed Feb. 4, 2000, entitled "Selective Interception of System Calls".
Pending U.S. Appl. No. 09/498,450, filed Feb. 4, 2000, entitled "Dynamic Scheduling of Task Streams in a Multiple-Resource System to Ensure Task Stream Quality of Service".
Pending U.S. Appl. No. 09/500,212, filed Feb. 8, 2000, entitled "Disambiguating File Descriptors".
Pending U.S. Appl. No. 09/502,155, filed Feb. 11, 2000, entitled "Restricting Communication Between Network Devices on a Common Network".
Pending U.S. Appl. No. 09/503,975, filed Feb. 14, 2000, entitled "Restricting Communication of Selected Processes to a Set of Specific Network Addresses".
Rusling, D. A., Processes, [online], [retrieved on Dec. 7, 1999]. Retrieved from the Internet: <URL: http://www.cebaf.gov/~saw/linux/tlk-html/node44.html>.
Rusling, D. A., Linux Processes, [online], [retrieved on Dec. 7, 1999]. Retrieved from the Internet: <URL: http://www.cebaf.gov/~saw/linux/tlk-html/node45.html>.

Rusling, D. A., Identifiers, [online], [retrieved on Dec. 7, 1999]. Retrieved from the Internet: <URL: http://www.cebaf.gov/~saw/linux/tlk-html/node46.html>.
Rusling, D. A., Scheduling, [online], [retrieved on Dec. 7, 1999]. Retrieved from the Internet: <URL: http://www.cebaf.gov/~saw/linux/tlk-html/node47.html>.
Rusling, D. A., Scheduling in Multiprocessor Systems, [online], [retrieved on Dec. 7, 1999]. Retrieved from the Internet: <URL: http://www.cebaf.gov/~saw/linux/tlk-html/node48.html>.
Rusling, D. A., Files, [online], [retrieved on Dec. 7, 1999]. Retrieved from the Internet: <URL: http://www.cebaf.gov/~saw/linux/tlk-html/node49.html>.
Symbol Table, [online] copyright 1997, 1998, [Retrieved on Apr. 4, 2003] Retrieved from the internet <URL: http://216-239-33-100/search?q=cache:eASXK8qC__-AC:www.caldera.com/developers/gabi/1998-04-29/ch4.s..., pp. 1-5.

* cited by examiner

Tunnel Connections

Multiplexing of Tunnels

Multiplexer/Demultiplexer Tunnel-to-Private Server Traffic

Multiplexing with Tunnel Switching

Tunnel Switch

Customer Lookup Table 800

| Incoming Physical Interface | Incoming Tunnel ID | Service | Customer ID |
|---|---|---|---|
| 712 | 710a | PS | Customer 1 |
| 712 | 710b | PS | Customer 1 |
| 712 | 710c | TS | Customer 2 |
| 732a | 730b | PS | Customer 1 |
| 732c | 730e | PS | Customer 3 |
| • • • | • • • | • • • | • • • |

Customer Lookup Table

FIG. 8

Separation of Internet and Private Server Traffic

Separation of Internet and PS Traffic

1100

ATM Tunnel Using DSL

ATM Tunnel Trace

ENABLING A SERVICE PROVIDER TO PROVIDE INTRANET SERVICES

Matter enclosed in heavy brackets [ ] appears in the original patent but forms no part of this reissue specification; matter printed in italics indicates the additions made by reissue.

CROSS-REFERENCE TO RELATED APPLICATIONS

*This patent application is a reissue application for U.S. Pat. No. 6,948,003, issued from U.S. patent application Ser. No. 09/526,980, filed on Mar. 15, 2000.*

This application is related to U.S. patent Ser. No. 09/452,286, entitled "Providing Quality of Service Guarantees to Virtual Hosts", by Pawan Goyal et al., filed Nov. 30, 1999, and commonly assigned with the present application. The subject matter of related application U.S. patent Ser. No. 09/452,286 is incorporated by reference herein in its entirety.

BACKGROUND

1. Field of Invention the present invention relates generally to providing private networking services, e.g., Intranet services, remotely, and more particularly, to allowing a service provider to locate and manage private network servers at the service provider's location, while connecting the servers to a customer's premises such that they appear to be local and private to the customer.

2. Background of the Invention

Networked computer resources are growing more popular as the benefits of sharing computing resources becomes evident. One of the fastest-growing segments of the Internet is the private network market. A private network is an interconnected group of computing resources accessible only by the network members. Security protocols are used to ensure that only authorized users have access to the network's resources, even where the network operates on the public network infrastructure and protocols. A private network, often belonging to a corporation, may be used to store web pages and other shared information. This information is maintained in a private space, generally screened off from external sources such as the Internet by a firewall which blocks unauthorized access. Such private networks are often referred to as intranets, local area networks (LAN) or wide area networks (WAN).

In a typical LAN implementation, a single location contains a group of individual user computers, as well as one or more dedicated host computers executing server programs to maintain the network's shared information. The private LAN is screened off from the Internet by a firewall, though users may access the Internet if needed. Network traffic intended for the network is allowed through the firewall only if authorized. The resources within the LAN all may communicate using private addresses. It is not necessary to use registered IP addresses for each resource because the system is screened off from the global Internet.

This model may be extended to multiple location sites. Computer networks that span relatively large geographical distances are typically referred to as WANs. In a private WAN, individual sites must be connected in a secure manner. A secure connection between WAN sites may be accomplished using a virtual private network. A virtual private network utilizes ordinary Internet protocols and may also use public communications mediums to connect; however, privacy is ensured through features such as tunneling (data encapsulation) or the use of leased lines. A leased line is a permanent connection between two points that is always active. Resources on a WAN may communicate using only private addresses because the network is screened off from the global Internet.

Private networks contain common elements. Each generally contains a dedicated local server to maintain the shared private network data, and a communications system for providing data communication services between machines on the private network. Communication takes place using a private address space. Because the address spaces for individual private networks need only be locally unique, the address spaces among several different private networks may overlap because the networks are isolated from each other. More specifically, in private intranets, two unrelated intranets at different companies may use the same local addresses for user computers. No conflict arises since the networks are not connected.

Data communications services and servers are not easy to configure, manage, and maintain. Thus, there is an incentive for the service providers that offer access to communications facilities to provide such private network services and servers as well, thereby relieving corporations from the burden of providing these services directly. Some examples of service providers are: Internet Service Providers (ISP), Application Service Providers, Network Service Providers, and Competitive Local Exchange Carriers (CLEC).

It is not economically feasible for a service provider to remotely manage servers located on a customer's premises, and support many different customers in this fashion. Rather a service provider would prefer to offer private network services to multiple customers while keeping all of the server host computers within a location of the service provider for ease of management. Accordingly, service providers typically dedicate a physical host computer as each individual customer's server, and maintain each host computer in the centralized facility. However, this means the service provider will have to own and maintain potentially large numbers of physical host computers, at least one for each customer's server or private network However, many customers will neither require nor be amenable to paying for the use of an entire host computer. Generally, only a fraction of the processing power, storage, and other resources of a host computer will be required to meet the needs of an individual customer.

Alternatively, a service provider may utilize one physical host computer to provide commercial host services to multiple customers. Using Transmission Control Protocol (TCP) and other transport protocols, a server application executing on a single physical host can be programmed to process requests made to multiple network addresses. Such functionality is known as virtual hosting.

In virtual hosting, each customer is assigned a network address (or domain name), and is provided with resources on a single, physical host computer, effectively sharing the host with other customers. A client computer requests data from a specific customer's host by targeting communication requests to the appropriate network address (or domain name). The virtual host server can service requests to multiple network addresses or domain names. Thus, the functionality of numerous hosts is provided by a single physical host computer, servicing requests made to a plurality of network addresses and domain names by multiple customers.

However, virtual hosting it is commonly performed today does not provide many of beneficial features of private networks. Service providers will have to be able to provide certain features of private networks before customers will be willing to outsource services related to the operation and maintenance of their private network. First, customers will want to ensure that their private data is inaccessible to other customers sharing the same host computers. For instance, if a service provider provides email outsourcing for both Company A and Company B on the same computer, Company A will want to ensure that the directories in which its email is stored are not accessible to Company B, and vice versa.

Additionally, customers will want to ensure that their services are not compromised due to problems originating with another customer. If a service provider uses a single host computer to provide server resources for both Company A and Company B, steps must be taken to ensure that overuse of the resources by Company A does not impact Company B's service. Additionally, faults, crashes, or similar problems caused by one customer must not compromise the service provided to another customer. Such performance degradation issues must be contained by the service provider to impact only the customer responsible for the problem, and not to impact any other customers.

Finally, companies A and B will want their servers to have IP addresses that belong to their own private address spaces. Using addresses from each company's own private address space offers more security because private IP addresses are not reachable over the public Internet. The use of private IP addresses guards against private servers becoming accessible from the public Internet by accidental misconfiguration of equipment. Also, public IP addresses are a limited resource; there is insufficient address space for private networks to consume addresses from the public address space. Furthermore, if a company connects a number of servers or corporate locations together they will wish to establish a virtual private network. To run the routing protocols required for communications within a virtual private network requires a coherent addressing scheme. Such a virtual private network is easier to manage from a private address space.

However, the use of private address schemes creates difficulties for the service provider. The service provider may now have several virtual servers assigned to the same IP address, because companies A and B may have overlapping address spaces, as is typical in private networks. This address overlap can cause the communication network to fail. Typically, one of the virtual servers would become unreachable due to this address overlap error.

Thus in order to satisfy customers' needs, a service provider desiring to provide private network services must be able to guarantee four different kinds of isolation. Functional isolation separates the data and functionality of each customer. Fault isolation protects one customer from the faults created by another customer. Performance isolation allows each customer to receive a performance commitment independent of the behavior of other customers. Address isolation allows each customer to choose the virtual server IP address that it wants to be associated with, independent of other customers.

Virtual hosting currently cannot provide these beneficial features of ordinary private servers. This is due to the inability of a virtual host to allocate appropriate amounts of computer resources of the physical host computer to servicing client requests made to specific virtual hosts, and hence to specific customers. A private virtual server, by contrast, is able to provide the functional, fault, and performance isolation that an ordinary virtual server cannot. A method for creating such a private virtual server is disclosed in the related application identified above, U.S. patent Ser. No. 09/452,286, entitled "Providing Quality of Service Guarantees to Virtual Hosts."

However, a method and system is still needed to allow customers to use their own private address spaces to communicate with a remotely-located private virtual server maintained by a service provider, where the private virtual server addresses may overlap.

SUMMARY OF THE INVENTION

The present invention allows providers of virtual servers to properly differentiate and route transmissions using private addresses on a common host server. The term "private virtual server" as used herein is a virtual server that supports a private address space wherein the private address spaces of different private virtual servers may overlap.

Customers exchange privately-addressed transmissions with a service provider using tunnels to traverse the local or regional network connecting the customer with the service provider. The service provider receives the transmissions at a gateway into the service provider's data center. The service provider then routes the transmission to the private virtual server belonging to the customer that sent the transmission. The service provider also routes privately-addressed transmissions back to individual customers using tunnels. In this way, the service provider is able to implement a separate routing context on behalf of each individual customer.

The present invention allows for flexibility in designing a private virtual server that suits an individual customer's needs. For example, an individual customer may have multiple physical sites all utilizing the same private virtual server. Optionally, an individual customer may be assigned more than one private virtual server, for instance, if different divisions of an organization each wish to maintain their own private servers while making all the data available to the organization at large.

In one embodiment, the present invention comprises a multiplexing/demultiplexing mechanism capable of routing signals to and from one or more private virtual servers located on a physical host computer. Each private virtual server is associated with only one private network. The multiplexing/demultiplexing mechanism receives a privately addressed transmission and routes it to the private virtual server with which it is associated. The privately addressed transmission may then be processed within the private virtual server in the same manner as if the server was actually a physical server resident within a LAN. The multiplexing/demultiplexing mechanism also receives an outgoing transmission from a private virtual server and routes it back to the private network associated with it. Incoming and outgoing transmissions are addressed using a tunneling scheme. Tunneling allows privately-addressed transmissions to be transported over a network that uses global addresses and allows customers to address their private virtual server using a non-unique private address. As a result, all transmissions to and from a customer are sent only to the customer's respective private virtual server.

In another embodiment, the present invention includes more than one physical host computer. Each physical host computer contains one or more private virtual servers. Privately-addressed incoming transmissions are sent to the service provider's data center. The transmissions are placed on tunnels to traverse the local or regional network connecting the customer with the service provider. A tunnel switching mechanism is used to forward transmissions received at the service provider's data center to the proper physical host computer.

In another embodiment, the present invention is a method for locating and managing private network services in a data center location remote from private network users. The method comprises receiving a transmission addressed using a private address of a recipient, and routing the transmission to a private virtual server. The correct private virtual server is determined from the address of either the sender or the recipient of the transmission.

The foregoing merely summarizes aspects of the invention. The present invention is more completely described with respect to the following drawings and detailed description.

BRIEF DESCRIPTION OF THE DRAWINGS

FIG. 8 is a diagram of a customer lookup table for a tunnel switch in an embodiment of the present invention.

DETAILED DESCRIPTION OF THE PREFERRED EMBODIMENTS

Reference will now be made in detail to several embodiments of the present invention, examples of which are illustrated in the accompanying drawings. Wherever practicable, the same reference numbers will be used throughout the drawings to refer to the same or like parts. The figures depict preferred embodiments of the present invention for purposes of illustration only. One skilled in the art will readily recognize from the following discussion that alternative embodiments of the structures and methods illustrated herein may be employed without departing from the principles of the invention described herein.

Figure 1:
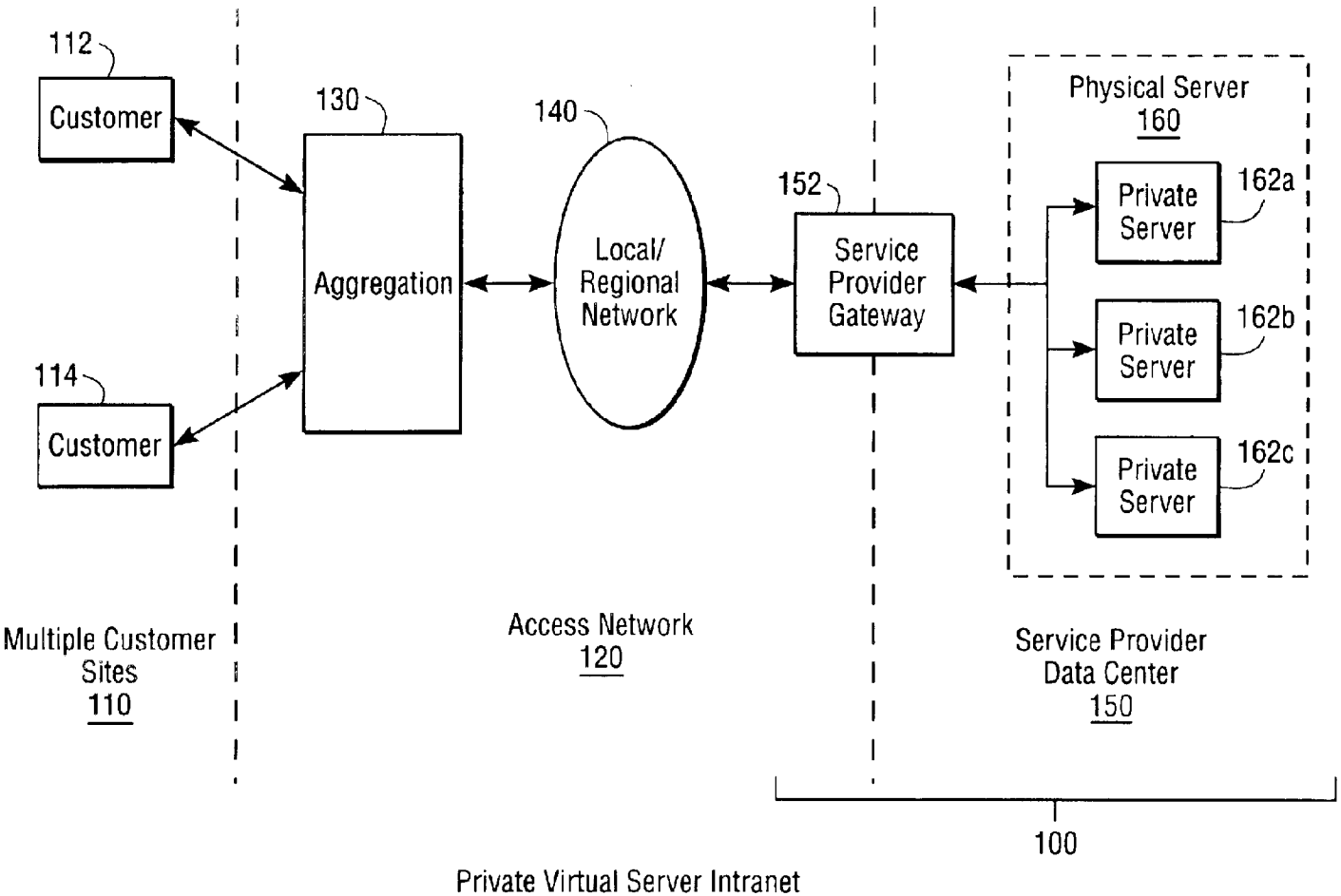
FIG. 1 is an illustration of a private virtual server system in accordance with the present invention.

FIG. 1 is an illustration of an embodiment of a private virtual server system, which replaces multiple private Intranet servers. A private virtual server system 100 includes a service provider gateway 152 that connects to a service provider data center 150. System 100 is connected to multiple customer sites 110 via an access network 120. Customers, e.g. 112 and 114, are located in potentially any global location, although frequently customers are located within the regional access network of the service provider. As will be evident to one of skill in the art, any number of customers may be supported by the private virtual server system 100. Only the resources of the physical servers owned by the service provider limit the number of customers supported. Furthermore, a service provider may add additional physical servers as required to support additional customers.

As used herein, the terms "customer", "user", and "private network user" refer to individuals or groups of individuals accessing the same private virtual server. Typically, a private virtual server "user" is a group of individuals with a shared association. For example, "user" may collectively refer to the employees of a company, or to certain employees within a division of a company. One company (a "customer") may have several different users, each corresponding to a different group within the company. Additionally, a "user" may also refer to a single individual.

In the present invention, customers send and receive data using a network. In one embodiment, the protocol used within each customer's network will be IP (Internet Protocol). The IP addressing format will also be assumed herein for purposes of illustration. However, it will be evident to one of skill in the art that a different network protocol could be used instead of IP within a customer's private network, for example, Open Systems Interconnection (OSI), Internetwork Packet Exchange (IPX), System Network Architecture (SNA), and Asynchronous Transfer Mode (ATM).

Data from customers 112 and 114 may optionally be aggregated 130 before being sent out over a local or regional network 140. Aggregation 130 is not required, but generally is done to concentrate data traffic for more efficient transmission over a network. For example, a customer site may aggregate the multiple data streams coming from various different users (clients) within the site before transmitting data onto a public network.

Aggregation 130 may also take place between customers and non-customers. This may occur when data transmission sites are located physically close together, to consolidate traffic flow onto the local or regional network 140. In another example, aggregation is also common in digital subscriber line (DSL) systems. A digital subscriber line access multiplexer (DSLAM) concentrates data traffic from multiple DSL loops onto the backbone network before connection to the rest of the local or regional network 140. Data directed to different destinations will be separated and individually routed within the local or regional network 140.

The local or regional network 140 connects a customer with a private virtual server system 100. The local or regional network 140 may be comprised of different types of interconnected networks. System 100 is capable of functioning with a wide variety of different local or regional networks 140, as will be evident to one of skill in the art.

Traffic from each individual customer 112 and 114 is aggregated 130 and transported across the local or regional network 140 until it reaches a service provider gateway 152. The service provider gateway 152 provides the connection into the service provider data center 150. The service provider gateway 152 direct traffic from each customer to the private virtual servers it owns and prevents traffic from reaching private virtual servers a customer does not own.

The service provider gateway 152 connects to a physical server machine 160. The physical server machine 160 may be any kind of computer adapted to support private virtual servers. It is to be understood that a service provider data center 150 will typically contain more than one physical server machine 160.

Located on the physical server machine 160 is a group of private virtual servers 162. In one embodiment, each private virtual server 162 is capable of implementing quality of service guarantees to individual customers. A service provider may implement different quality of service guarantees by allocating different percentages of the physical server machine 160 to servicing each of the private virtual servers 162. Thus the private virtual servers 162 may each consume a different percentage of the resources of physical server machine 160. This resource allocation may be dynamically changed by the service provider as required.

In one embodiment, the IP network address of each private virtual server 162 corresponds to a private address from the private address space of the respective customer assigned to the private virtual server. A private address is any locally-assigned address, which does not have to be unique within the global Internet. Conversely, a global address is a registered IP address that is unique within the public network system of communications. Generally, connecting a private network to a public network requires network address translation, which maps global addresses onto private addresses at the public/private network boundary. Private addresses are not routable in the public network, therefore transmissions cannot be sent to the private virtual servers 162 across the public network 120 using only their private addresses.

The network addresses for the private virtual servers are chosen to correspond to each customer's private address space. The private address spaces of customers 112 and 114 may overlap. Therefore, the network addresses for these customers' assigned virtual private servers may not be unique. It is possible for private virtual servers 162 to all be assigned the same network address.

Thus the use of private addresses for the private virtual servers creates two different problems: such private addresses cannot be used to transmit data directly across a public network, and there may be address overlap among the private virtual servers.

Figure 2:
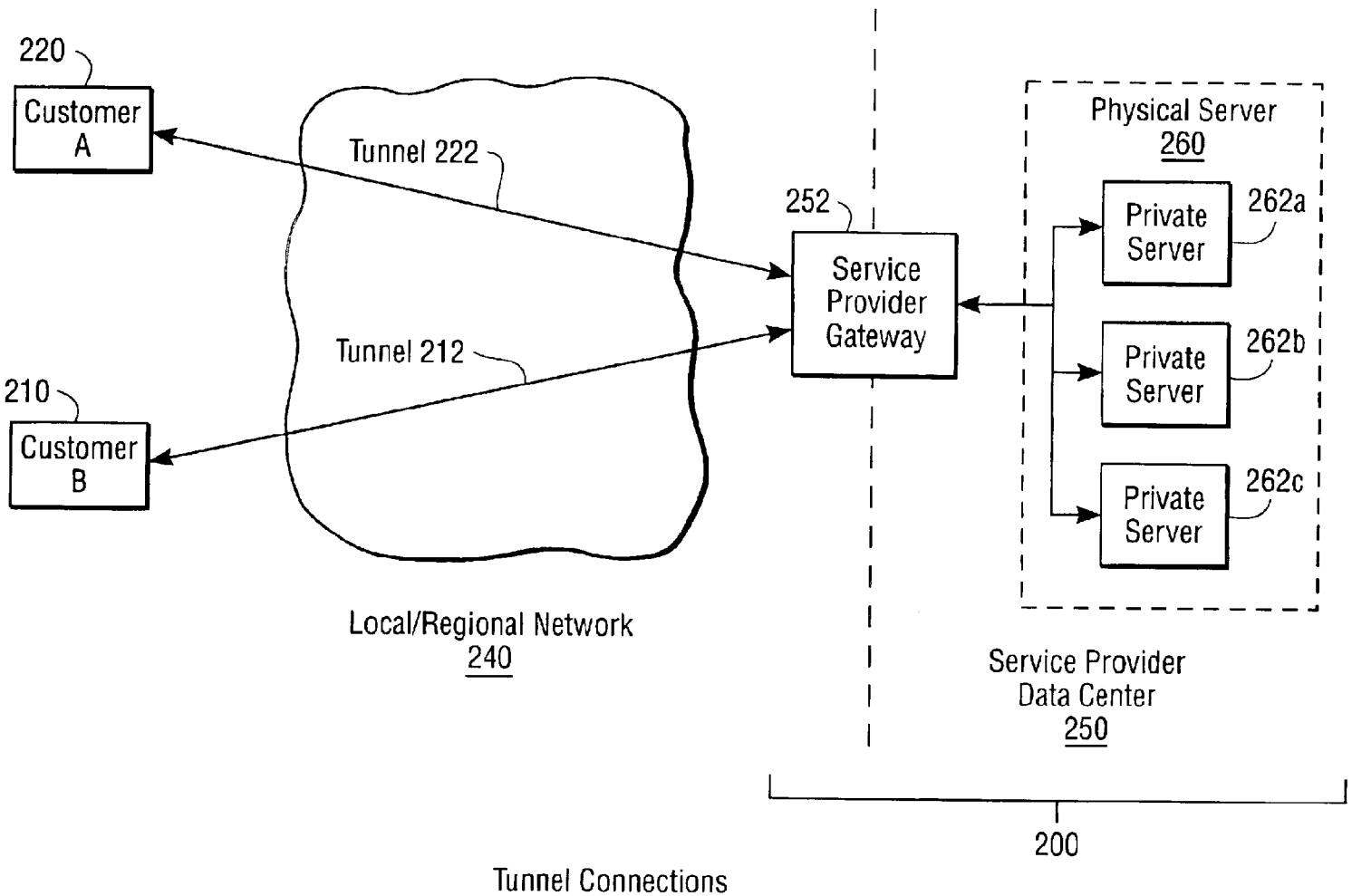
FIG. 2 is an illustration of an embodiment of a private virtual server system with individual tunnels between each customer and associated private virtual server.

A solution to the problem of transporting privately-addressed transmissions is shown in FIG. 2. FIG. 2 is an illustration of an embodiment of a private virtual server system 200 that uses individual tunnels to connect between each customer and a service provider. The tunnels provide a means to transmit privately-addressed data across a public network.

FIG. 2 shows a private virtual server system 200. The private virtual server system 200 includes a service provider gateway 252 that connects to a service provider data center 250. A physical server machine 260 contains three private virtual servers 262. These private virtual servers may have overlapping private IP addresses. Private virtual server 262A is assigned to a customer 220, while private virtual server 262B is assigned to a customer 210. Customers 210 and 220 are connected to the private virtual server system 200 via a local or regional network 240.

Customers 210 and 220 use tunnels to allow privately-addressed data transmissions to traverse the local or regional network 240. Customer 210 has a single tunnel 212 from customer 210's site to the service provider gateway 252. Similarly, customer 220 has a single tunnel 222 from customer 220's site to the service provider gateway 252. A tunnel is created by encapsulating a data transmission within a second type of addressing protocol. Transmissions, which use addresses that are unique only within a narrow scope, may thus be transported across a second network within a wider address scope. In this way, private IP addresses that are only unique within a private IP network are encapsulated for transport across the global public Internet. The origination of the tunnel, on the customer's side, must occur before traffic from multiple customers is aggregated. The numbers of customers and private virtual servers shown in FIG. 2 is merely representative. It is to be understood that a service provider may have more or fewer customers. Furthermore, a physical host machine may contain more or fewer private virtual servers.

Figure 3:
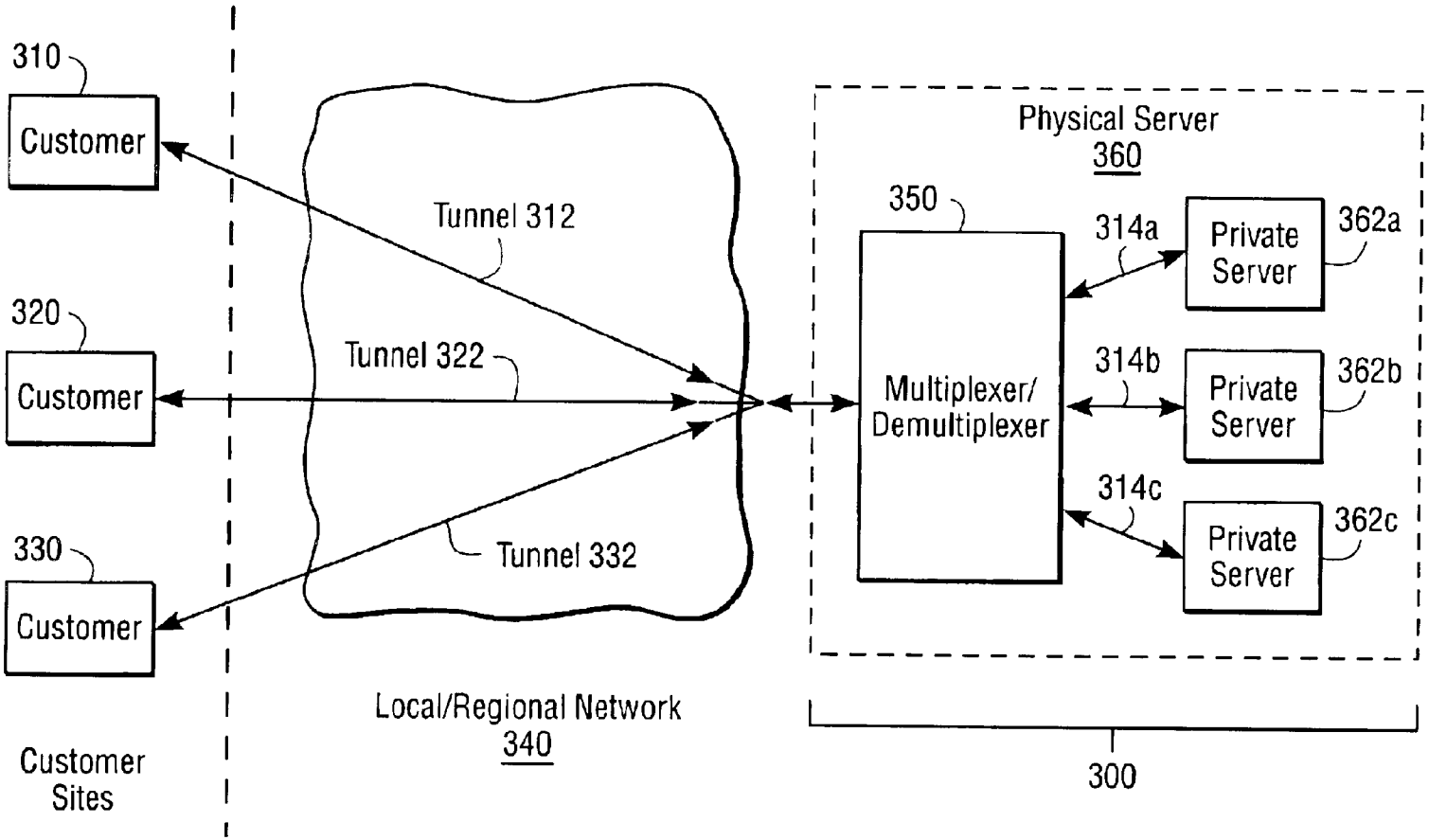
FIG. 3 is an illustration of an embodiment of a private virtual server system with a multiplexing/demultiplexing mechanism.

System 200 demonstrates how a customer can be communicatively coupled to a private virtual server system using privately-addressed transmissions. However, once privately-addressed transmissions are routed across a public network, the problem of potential address overlap among the destination private virtual servers still remains. FIG. 3 demonstrates a method for routing transmissions to private virtual servers, where the private virtual servers may have overlapping address spaces.

FIG. 3 is an illustration of an embodiment of a private virtual server system 300 including a multiplexing/demultiplexing mechanism 350. Private virtual server system 300 provides a separate routing context on behalf of each user to route privately-addressed transmissions between the users and the private virtual servers. System 300 is connected to three customer sites 310, 320 and 330. Each customer uses a tunnel to traverse the local or regional network 340 and arrive at a physical server machine 360 within the private virtual server system 300. Customer site 310 uses a tunnel 312, customer site 320 uses a tunnel 322, and customer site 330 uses a tunnel 332. Each tunnel is a different data encapsulation. Multiple tunnels may be carried on the same physical medium connecting to the multiplexing/demultiplexing mechanism 350.

In another embodiment, the tunnels 312, 322, and 332 could be replaced with dedicated leased lines. A leased line is a permanent connection between two points set up by a telecommunications common carrier. A leased line is not part of the global public network, and therefore may carry privately-addressed traffic.

The physical server machine 360 contains three private virtual servers 362, as well as a multiplexing/demultiplexing mechanism 350. Incoming tunnels 312, 322, and 332 communicatively couple to the multiplexing/demultiplexing mechanism 350. The private virtual servers 362 may have overlapping IP addresses. A set of internal pointers 314 is used to direct traffic from the multiplexing/demultiplexing mechanism 350 to the correct private virtual server 362, thereby communicatively coupling the multiplexing/demultiplexing mechanism 350 to the private virtual servers 362.

The multiplexing/demultiplexing mechanism 350 performs the functions of separating incoming communication streams back into their original constituent streams, and merging multiple separate communication streams onto a single physical communications medium. In one embodiment, the multiplexing/demultiplexing mechanism 350 is implemented in the network interface card of the physical server machine 360. The multiplexing/demultiplexing mechanism 350 may be implemented in an application specific integrated circuit (ASIC) on the network interface card, or on the software driver.

Incoming tunneled transmissions are sent on a physical medium as packet flows. When the multiplexing/demultiplexing mechanism 350 demultiplexes an incoming set of packet flows, incoming packets are stored in a buffer and one of the fields in the packet header is used to select the incoming packet queue to which the buffer should be linked. An incoming packet queue is a list of pointers wherein each pointer points to a packet buffer. Thus packets arriving with different tunnel identifiers are linked to different incoming packet queues. There is one incoming packet queue per tunnel.

Outgoing transmissions sent by the various private virtual servers are also packet flows. Each private virtual server has its own outgoing packet queue. These packet queues are again implemented as lists of pointers to packet buffers. The scheduler in the network interface card selects which of the non-empty outgoing packet queues it should serve next. The scheduler takes the pointer from the head of the selected queue and transmits the packet from the buffer that is pointed to by the pointer.

Figure 4:
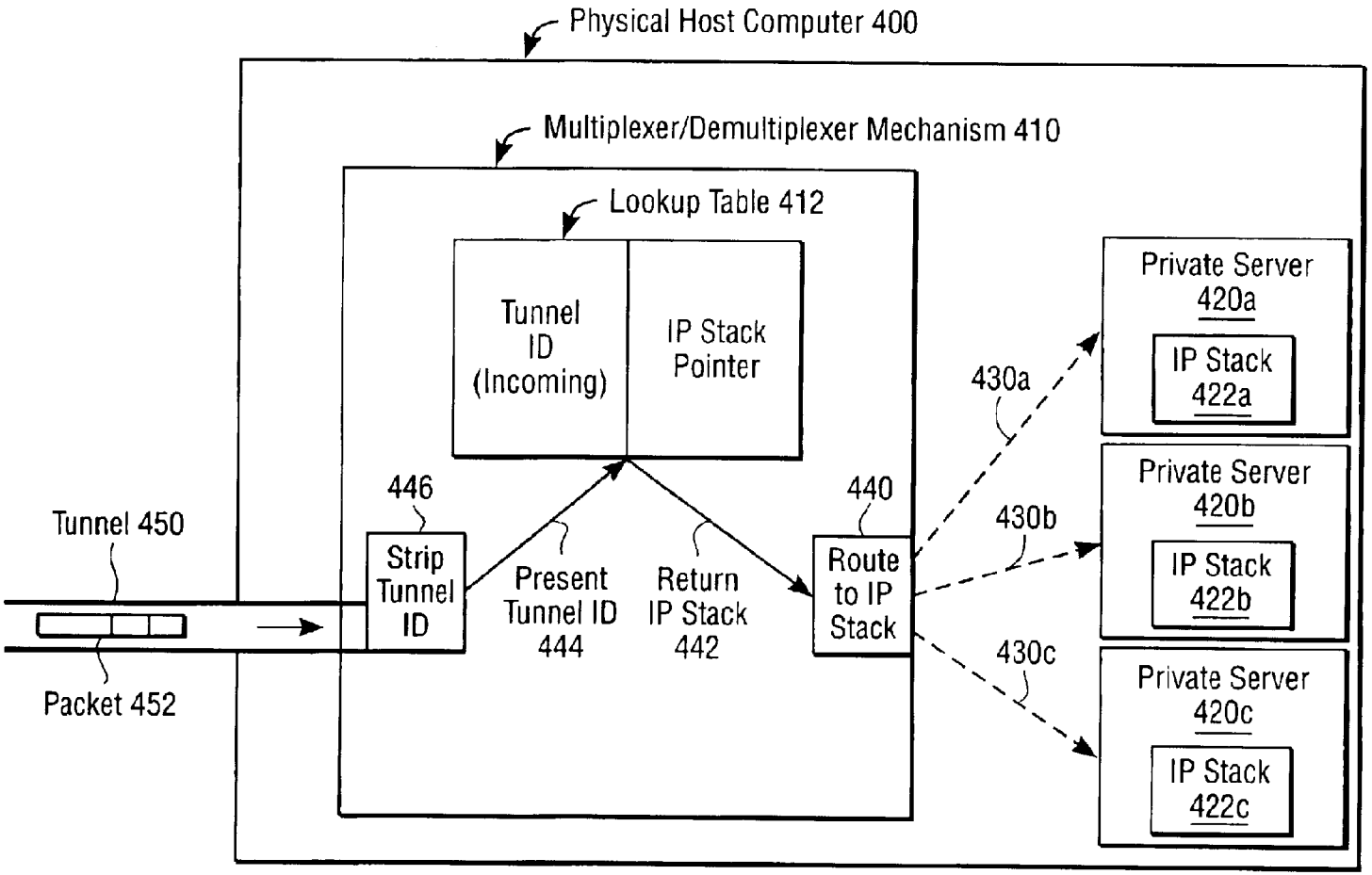
FIG. 4 is a block diagram illustrating the tunnel-to-private virtual server traffic flow of a multiplexing/demultiplexing mechanism.
Figure 5:
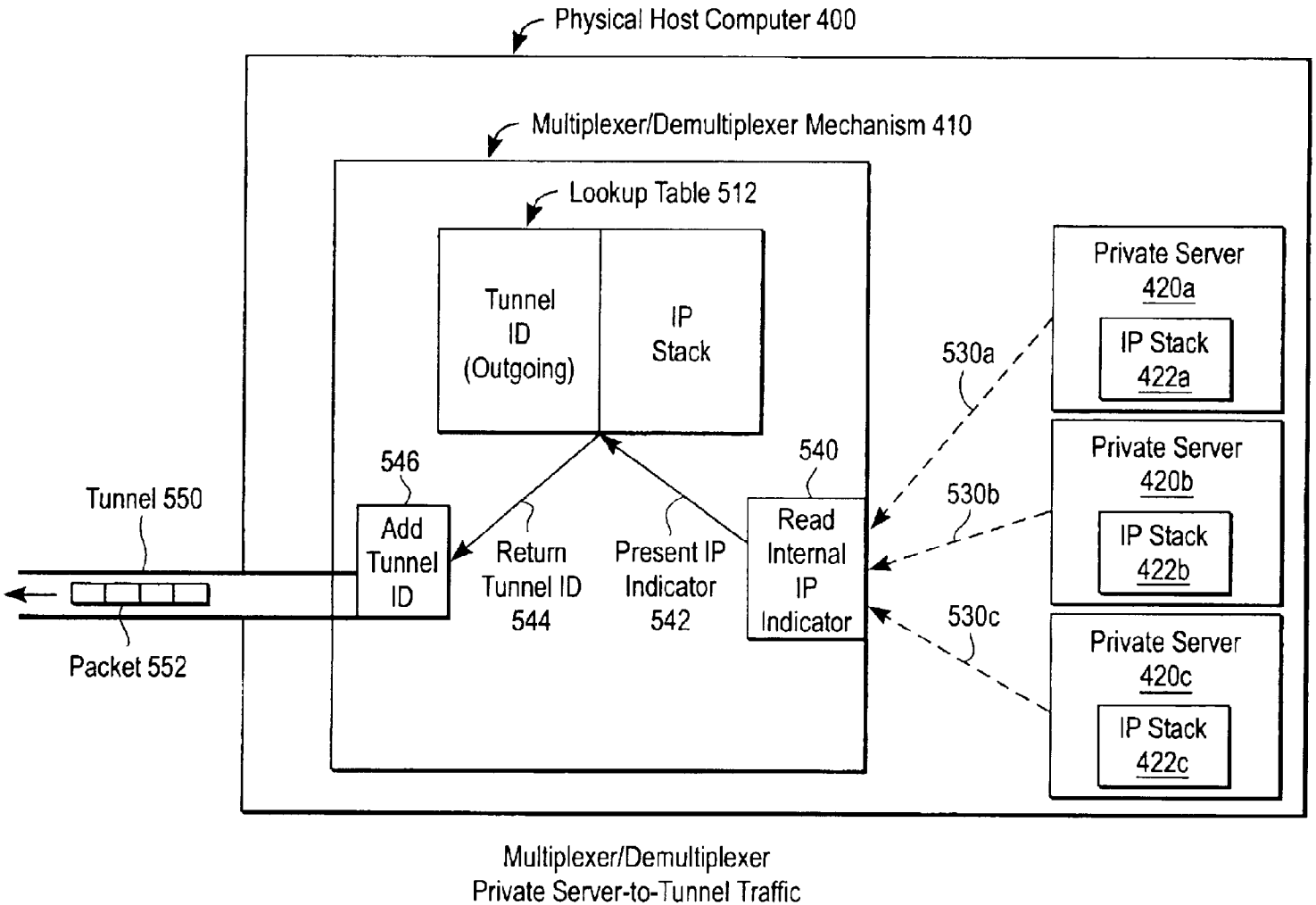
FIG. 5 is a block diagram illustrating the private virtual server-to-tunnel traffic flow of a multiplexing/demultiplexing mechanism.

The tunnel switching operations of the mutiplexing/demultiplexing mechanism 350 are shown in more detail in FIGS. 4 and 5. FIG. 4 is a block diagram illustrating the tunnel-to-private virtual server traffic switching functions of a multiplexing/demultiplexing mechanism. FIG. 5 is a block diagram illustrating the private virtual server-to-tunnel traffic switching functions of a multiplexing/demultiplexing mechanism.

FIG. 4 shows an embodiment of a physical host computer 400 including three private virtual servers 420A, 420B, and 420C. Each private virtual server includes an associated IP stack 422. An IP stack is a set of software processes that together manage the transfer of information in packets according to Internet protocols. Internet protocols define the rules and conventions for exchanging information across the Internet. The number of private virtual servers shown is merely illustrative. It is to be understood that a physical host computer may include more or fewer private virtual servers.

The physical host computer 400 also includes a multiplexing/demultiplexing mechanism 410. Multiplexing/demultiplexing mechanism 410 has an internal pointer 430 directed at each IP stack 422. Multiplexing/demultiplexing mechanism 410 includes a lookup table 412 that includes a list of incoming tunnel identifiers and pointers to their associated IP stacks within the physical host computer 400. Lookup table 412 is created by software residing on the physical host computer 400, which associates each IP stack with a particular customer, and ensures that transmissions sent from a particular customer are only directed to that particular customer's private virtual server.

A data packet 452 enters the multiplexing/demultiplexing mechanism 410 using an incoming tunnel 450. The tunnel 450 is not an individual physical connection, but is a means of encapsulating the packet 452 to permit routing across a public network. Although only one incoming tunnel 450 is shown in FIG. 4, this is merely illustrative. It is to be understood that there may be multiple different tunnels entering the multiplexing/demultiplexing mechanism 410.

The tunnel identifying information of the incoming packet 452 identifies which customer sent the packet 452. Packet 452's incoming tunnel identifying information is stripped 446, and the tunnel identifying information is presented 444 to the lookup table 412. Lookup table 412 returns 442 an internal pointer 430 for the appropriate IP stack 422. Packet 452 is then routed 440 to the identified IP stack 422 using the internal pointer 430.

An alternative embodiment is to embed the internal pointer 430 in the control data structure that controls the operation of the tunnel. The control data structure is typically located on the network interface card. The network interface card is typically located on the physical server machine 400.

FIG. 5 is a block diagram illustrating an embodiment of the private virtual server-to-tunnel traffic switching operations for the physical host computer 400. Multiplexing/demultiplexing mechanism 410 contains a lookup table 512 that consists of a list of IP stacks in the physical host computer 400 and their associated outgoing tunnel identifiers. Multiplexing/demultiplexing mechanism 410 ensures that packets sent from a customer's private virtual server are routed back to that customer on the correct outgoing tunnel.

A packet 552 is originally sent from the IP stack 422 of one of the private virtual servers 420. The packet 552 is directed 530 to the multiplexing/demultiplexing mechanism 410. Upon arrival at the multiplexing/demultiplexing mechanism 410, the internal tunnel IP stack identifier is read 540, and this identifier is presented 542 to lookup table 512.

Lookup table 512 returns 544 the associated outgoing tunnel identifying information. The outgoing tunnel identifier is added 546 to packet 552. Packet 552 is then sent out using the appropriate outgoing tunnel 550. The outgoing tunnel 550 is associated with the customer assigned to the private virtual server 420, which originally sent the packet 552. Although only one outgoing tunnel is shown in FIG. 5, this is merely illustrative. It should be understood that there may be multiple different outgoing tunnels. Each tunnel is not a separate physical connection; it is a specific encapsulation of data allowing the data to be separated out from other data sent on a physical connection.

An alternative embodiment is for the IP stack 422 of each private virtual server 420 to encapsulate the packet 552 with the proper outgoing tunnel header and tunnel identifier, thereby creating the tunnel 550. In this embodiment, the lookup table 512 is not used. The multiplexer/demultiplexer mechanism 410 merges the encapsulated and identified packet streams together, and sends them out.

A service provider will typically own and manage multiple physical server machines. Additionally, customers may wish to purchase more than one private virtual server, for example, for separate divisions within the same company. A customer may also have multiple physical customer sites using the same private virtual server, wherein each customer site uses a different tunnel to communicate with the service provider. A tunnel switch supports these different configurations in a private virtual server system.

A tunnel switch comprises one or more physical interfaces, with each interface capable of carrying many multiplexed tunnels. A tunnel switch will typically be capable of supporting a number of different physical interface technologies and a number of different types of tunnels for each type of physical interface. A tunnel switch performs two separate services: switching tunnels, and switching packets within a tunnel.

In a switching tunnels service, all packets arriving on one incoming tunnel are forwarded to an outgoing tunnel. This may be implemented without looking into the headers of the packets themselves. The tunnel switch notes which tunnel and physical interface the packet arrived on. Given the identifier of the incoming tunnel and the incoming physical interface, the tunnel switch uses a lookup table to specify the outgoing tunnel and physical interface.

In a switching packets service, incoming tunnels are terminated at the tunnel switch. The packets within each tunnel are extracted and switched individually based upon the incoming physical interface, the incoming tunnel, and information from the header of the packet. A private virtual server system supporting multiple physical servers, multiple private virtual servers per customer, and multiple customer sites per private virtual server will support such a switching packets service in addition to supporting a switching tunnels service.

Figure 6:
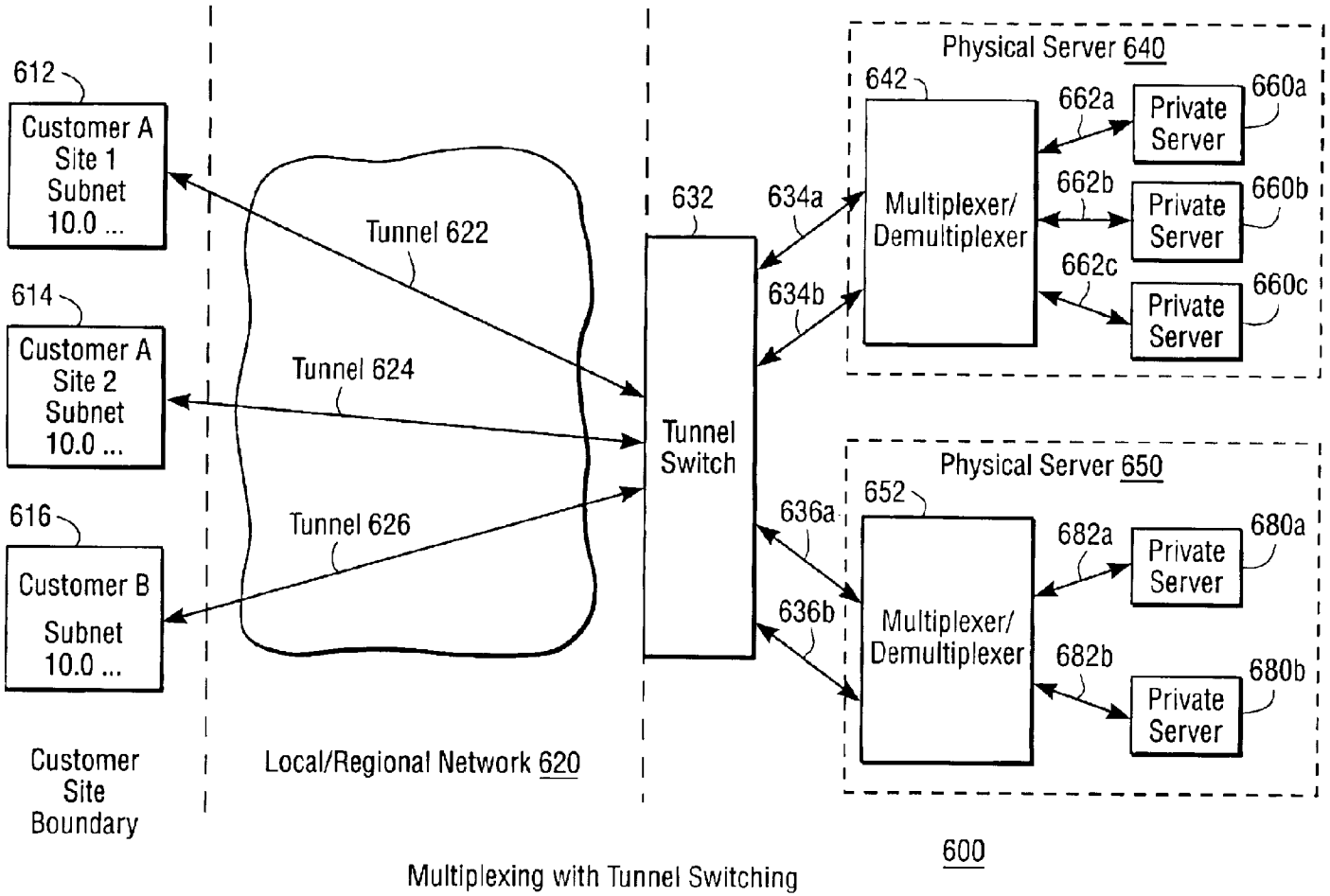
FIG. 6 is an illustration of an embodiment of a private virtual server system with multiplexing/demultiplexing mechanisms and a tunnel switch.

FIG. 6 is an illustration of an embodiment of a private virtual server system containing a tunnel switch. Private virtual server system 600 provides a separate routing context on behalf of each customer to route between the customer and each customer's associated private virtual server. A private virtual server system 600 is communicatively coupled to three customer sites 612, 614, and 616 across a local or regional network 620. The number of customers, physical servers, and private virtual servers shown in FIG. 6 is merely representative. It is to be understood that a service provider may have more or fewer customers and more or fewer physical servers. Furthermore, a physical server may contain more or fewer private virtual servers.

Each customer site is connected to the system 600 via an external tunnel that traverses the local or regional network 620 and communicatively couples to a tunnel switch 632. Customer site 612 uses external tunnel 622, customer site 614 uses external tunnel 624, and customer site 616 uses external tunnel 626. A tunnel switch 632 operates as the gateway to physical servers 640 and 650, and supports tunnels on multiple physical interfaces. Tunnel switch 632 is communicatively coupled to physical server 640 via a set of tunnels 634. Tunnel switch 632 is communicatively coupled to physical server 650 via a set of tunnels 636. Physical server 640 contains a multiplexing/demultiplexing mechanism 642, which is linked via a set of internal pointers 662 to a set of private virtual servers 660. Physical server 650 contains a multiplexing/demultiplexing mechanism 652, which is linked via a set of internal pointers 682 to a set of private virtual servers 680.

Figure 7:
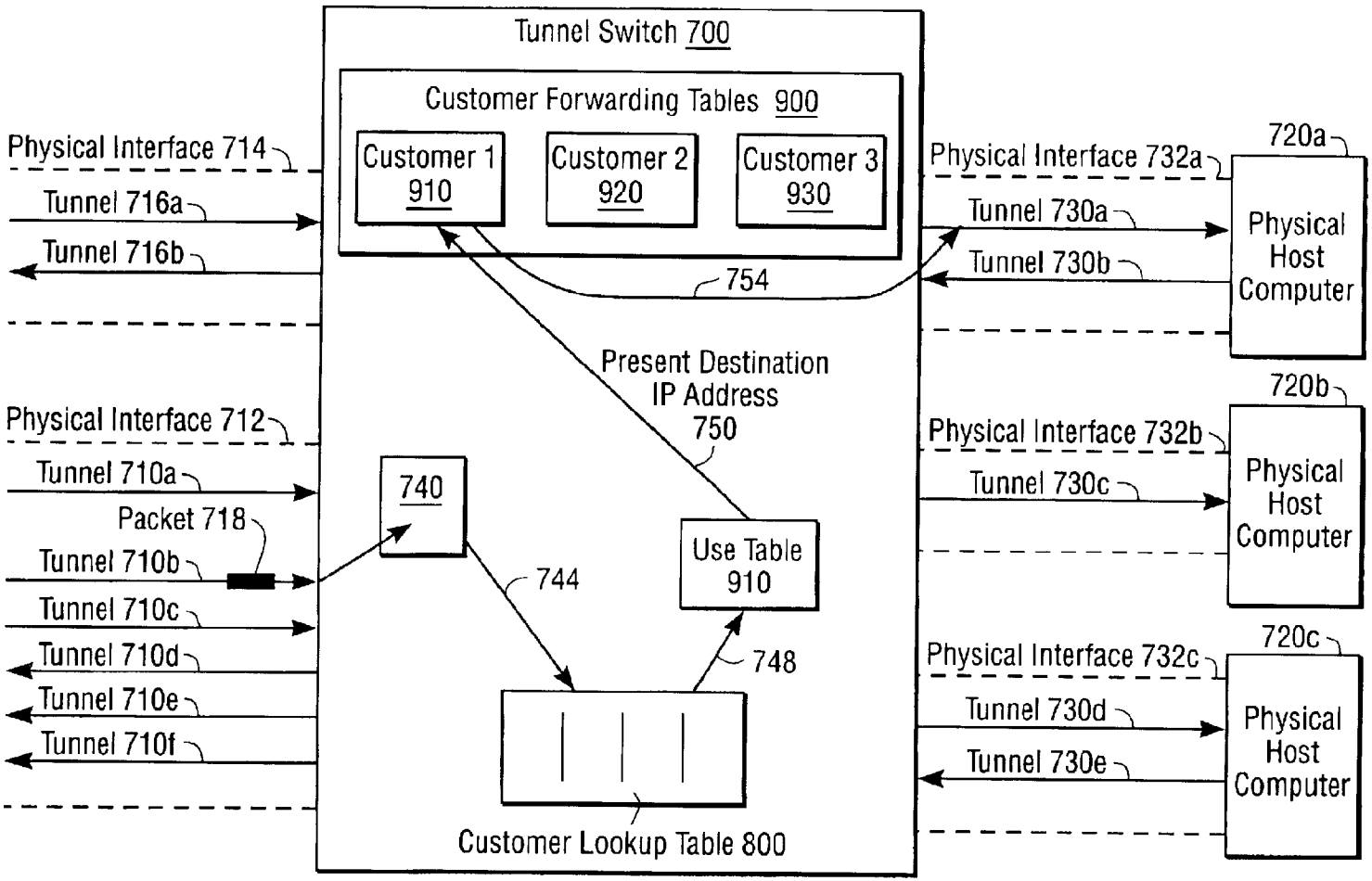
FIG. 7 is a block diagram illustrating the traffic flow of a tunnel switch.

FIG. 7 is a block diagram of an embodiment of the functions of a tunnel switch. A tunnel switch 700 is connected to a set of physical interfaces 712 and 714. Each physical interface 712 and 714 is capable of carrying a set of external tunnels. Physical interface 712 carries tunnels 710A, 710B, 710C, 710D, 710E and 710F. Physical interface 714 carries tunnels 716A and 716B.

Tunnel switch 700 also includes a set of outgoing physical interfaces 732 carrying a set of outgoing tunnels 730 to a set of physical host computers 720. Physical interface 732A carries tunnels 730A and 730B to physical host computer 720A. Physical interface 732B carries tunnel 730C to physical host computer 720B. Physical interface 732C carries tunnels 730D and 730E to physical host computer 720C. The tunnel switch 700 includes a customer lookup table 800 and a set of customer forwarding tables 900. The features of the customer lookup table and customer forwarding tables will be discussed in more detail before fully explaining the functions of the tunnel switch 700.

Figure 9:
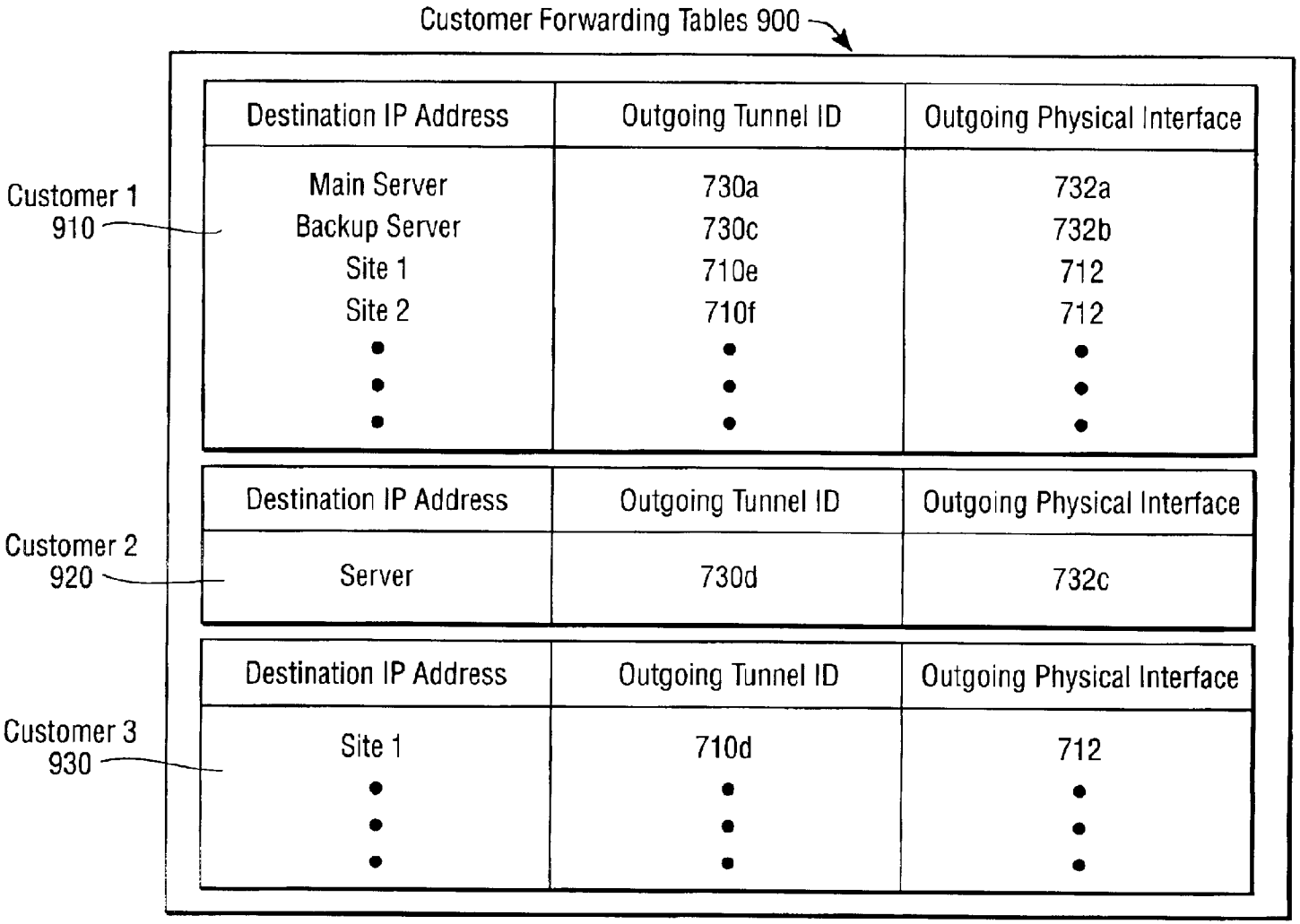
FIG. 9 is a diagram of a set of customer forwarding tables for a tunnel switch in an embodiment of the present invention.

FIG. 8 is an embodiment of a customer lookup table 800, and FIG. 9 is an embodiment of a set of customer forwarding tables 900. Together, table 800 and set of tables 900 are suitable for switching a set of transmissions from an incoming physical interface and tunnel to an outgoing physical interface and tunnel. An incoming transmission may be arriving at the tunnel switch either from a customer, or from a private virtual server. Similarly, an outgoing transmission may be directed towards a private virtual server or a customer. Tables 800 and 900 operate to switch transmissions in both directions. Customer lookup table 800 is used as an index into the correct customer forwarding table from the set of customer forwarding tables 900.

The customer lookup table 800 associates external tunnel and physical interface identifiers with a particular customer. Each customer listed in the customer lookup table 800 has an associated customer forwarding table. For example, customer 1's information is contained in customer forwarding table 910, and customer 2's information is contained in customer forwarding table 920. When a customer communicates with a private virtual server, each data transmission will arrive on a particular physical interface using a particular tunnel.

Customer lookup table 800 contains four fields: incoming physical interface, incoming tunnel identifier, service, and customer identifier. Each incoming physical interface and incoming tunnel identifier entry will reference a unique customer identifier. This customer identifier provides an index to the correct customer forwarding table associated with this physical interface/tunnel identifier pair. For example, a transmission arriving on physical interface 712 and incoming tunnel 710B would be indexed to customer 1's customer forwarding table (table 910 from FIG. 9). In another example in the opposite direction, a transmission arriving on physical interface 732A and incoming tunnel 730B would also be indexed to customer 1's customer forwarding table.

Each customer forwarding table 910, 920 and 930 contains three fields: destination IP address, outgoing tunnel identifier, and outgoing physical interface. Based upon the destination IP address of a particular transmission, the proper outgoing tunnel and outgoing physical interface is determined. Using customer lookup table 910 as an example, transmissions with a destination IP address of the "main server" for customer I would be placed on outgoing tunnel 730A on physical interface 732A. In the opposite direction, transmissions with a destination IP address of "site 1" for customer 1 would be placed on outgoing tunnel 710E on physical interface 712.

The information in the customer forwarding tables 900 is segregated by customer because the private address spaces of different customers may overlap, and therefore the destination IP addresses on each individual customer forwarding table are not unique within the set of all customer forwarding tables. For example, "main server" of customer 1 and "server" of customer 2 may have the same IP address.

The service field in the customer lookup table 800 identifies whether only a tunnel switching service (TS) is required, or a packet switching service (PS) is required. If only a tunnel switching service is required, the associated customer forwarding table will contain only a single entry specifying the proper outgoing tunnel and outgoing physical interface. For example, customer lookup table 800 indexes transmissions arriving on physical interface 712 and incoming tunnel 710C to customer 2, and identifies these transmissions as requiring only a tunnel switching service Customer lookup table 920 associated with customer 2 directs all traffic to outgoing tunnel 730D on physical interface 732C.

The customer lookup table 800 and customer forwarding tables 900 allow the tunnel switch 700 to support a variety of different private network configurations. For example, customer lookup table 800 shows that customer 1 uses two different incoming tunnels: 710A and 710B. Customer forwarding table 910 shows that customer I also has two different destination IP addresses corresponding to two different private virtual servers: "main server" and "backup server." Additionally, customer 1 has two different destination IP addresses corresponding to two different customer sites: "site 1" and "site 2." However, customer forwarding table 920 shows that customer 2 has only one private virtual server ("server"). The example private network configurations referred to herein are merely illustrative. It will be understood by one of skill in the art that many different configurations are possible.

Referring back to FIG. 7, FIG. 7 shows the steps associated with switching a packet between an external tunnel (in one embodiment, from a customer site) and a private virtual server. A physical interface 712 connects a set of external tunnels 710 to the tunnel switch 700. A packet 718 arrives on one of the external tunnels 710B. The incoming physical interface and tunnel identification information is read 740 from the packet 718, and presented 744 to a customer lookup table 800.

The customer lookup table 800 uses the physical interface and tunnel identifier to return 748 the correct customer forwarding table (910) for use with the packet 718. A group of customer forwarding tables 900 contains a customer forwarding table 910 that is associated with the customer that uses physical interface 712 and tunnel 710B. Packet 718's destination IP address, for example, "main server" is presented 750 to customer forwarding table 910.

From the information contained in customer forwarding table 910, the correct outgoing physical interface and tunnel identifier for packet 718 is identified 754. Referring to FIG. 9, destination IP address "main server" corresponds to outgoing tunnel 730A and physical interface 732A. Packet 718 is then placed on tunnel 730A that will transport it to the physical host computer 720A.

Customers utilizing a private virtual server system may also be accessing the global Internet. In this case, both the private virtual server communications traffic and the Internet communications traffic are sent out on a public network. A method for separating the two traffic streams is required.

Figure 10A:
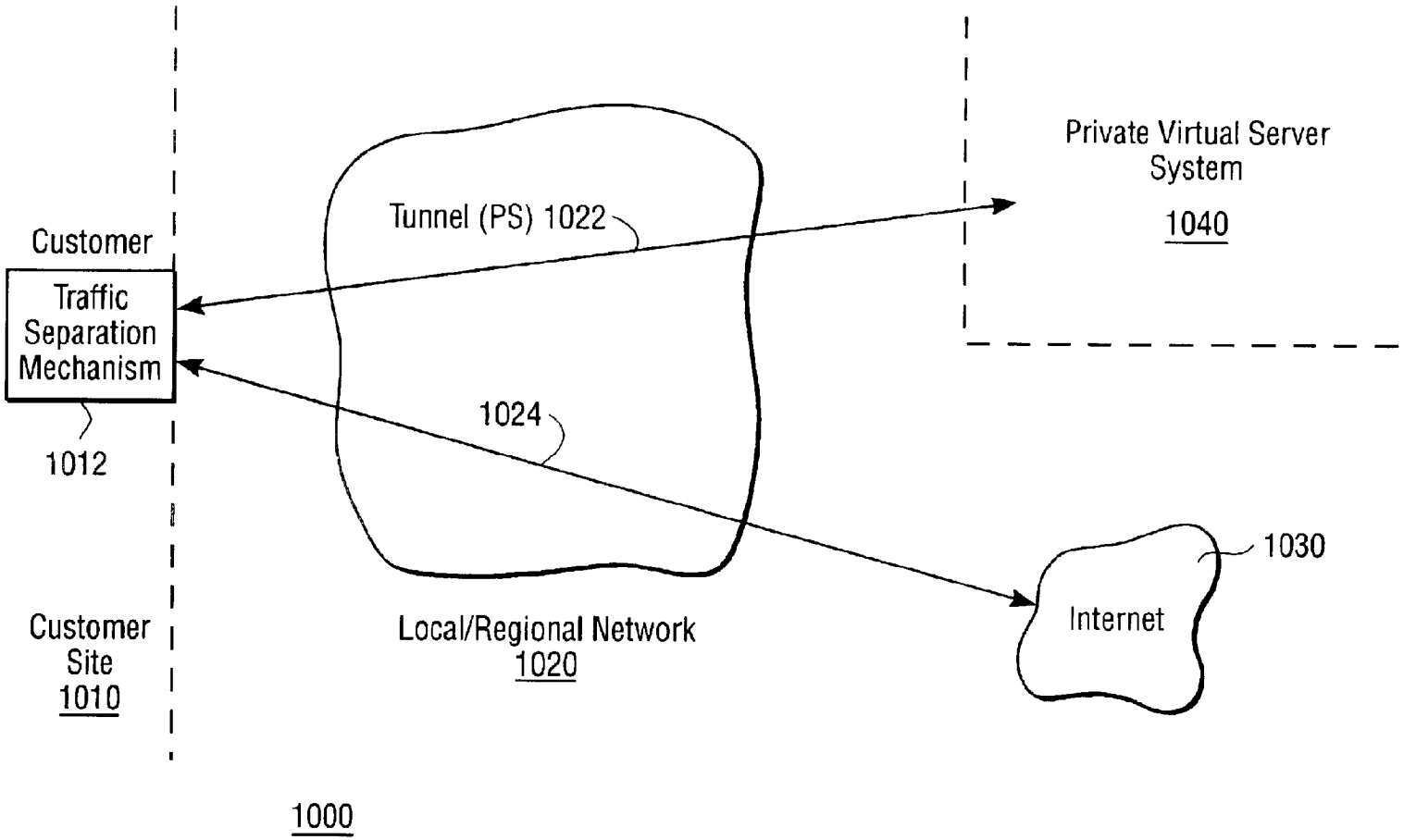
FIG. 10A is an illustration of an embodiment of a system for the separation of Internet and private virtual server traffic.

In one embodiment, shown in FIG. 10A, Internet traffic is separated out at the customer's site. FIG. 10A shows a system 1000 for separating Internet and private virtual server traffic. In system 1000, a traffic separation mechanism 1012 is located at the customer site 1010. A tunnel 1022 is created for sending private virtual server traffic across the local or regional network 1020. Internet traffic 1024 is separated out before reaching the local or regional network 1020 and sent separately to the Internet 1030.

Figure 10B:
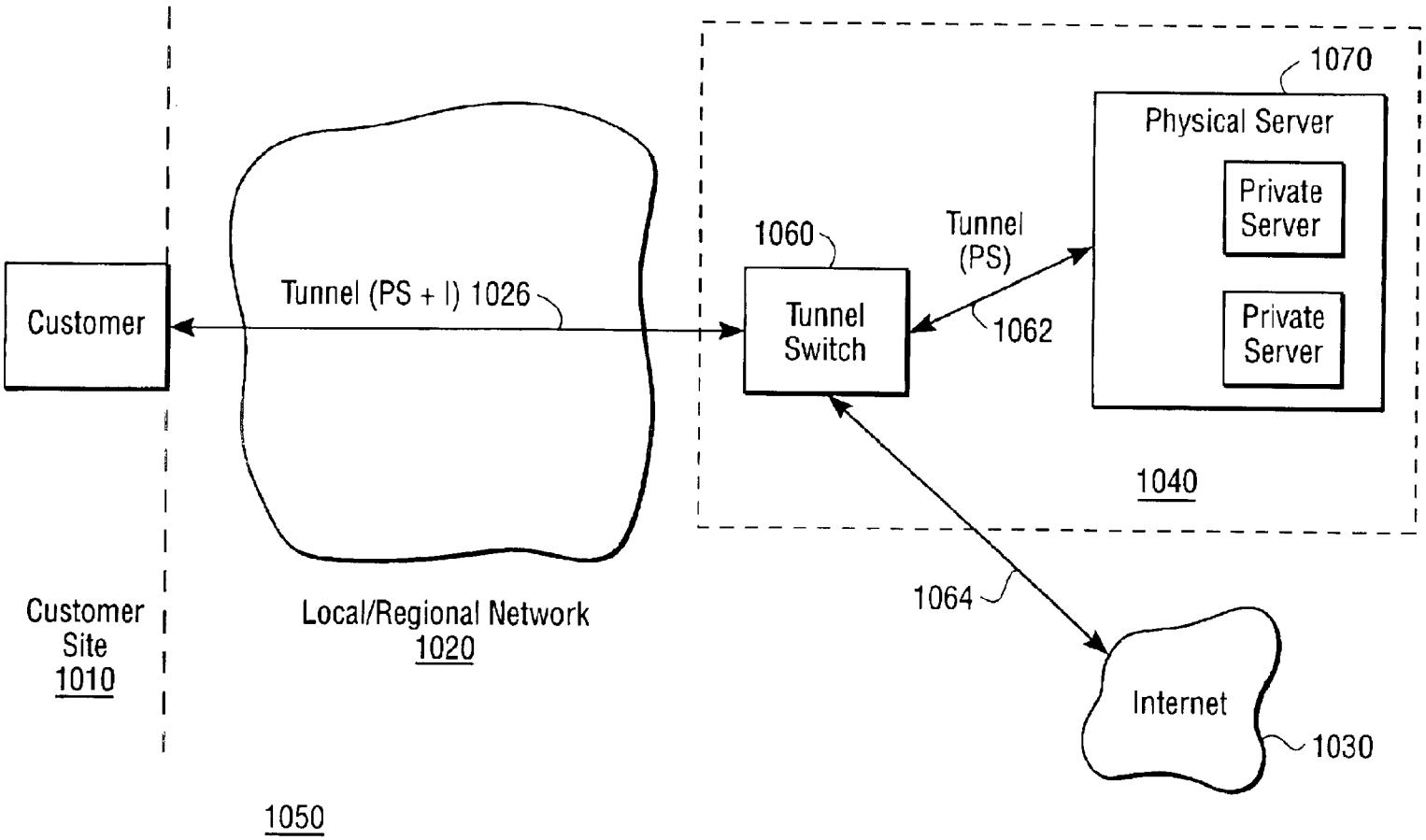
FIG. 10B is an illustration of another embodiment of a system for the separation of Internet and private virtual server traffic.

FIG. 10B shows another embodiment of a system for separating Internet and private virtual server traffic. System 1050 separates Internet traffic out after all customer traffic has reached a private virtual server system 1040. A customer site 1010 sends both Internet and private virtual server traffic out on a tunnel 1026 across the local or regional network 1020. All traffic arrives at the private virtual server system 1040 through a tunnel switch 1060.

Within the tunnel switch 1060, traffic addressed to the Internet is segregated out from traffic directed to the customer's private virtual server(s). The Internet traffic is sent out to the Internet 1030 via a public communications channel 1064. Internet responses back to the customer are returned in the same way that they were sent. The tunnel switch 1060 sends private virtual server traffic out on an internal tunnel 1062 to the physical server machine 1070 that holds the customer's private virtual server.

A variety of tunneling protocols may be used to create the tunnels used in the present invention. It is preferable to use a layer 2 tunneling protocol for security purposes. Layer 2 tunnels provide solid circuits that make it difficult to "spoof" a fake source address. Packets using a layer 3 tunneling protocol may be created with a fake IP address, allowing a packet to appear to come from a customer when in fact it was sent by an unauthorized third party. Tunnels using a layer 3 tunneling protocol require encryption so that an intruder cannot decode the information. Encryption is also required to protect against accidentally routing the traffic to an incorrect destination, because the encryption will prevent mis-directed traffic from being decoded. Preference for tunnel type depends upon the service provider's network architecture.

Typical examples of tunnel protocols include Asynchronous Transfer Mode virtual circuits (ATM VCs), frame relay virtual circuits (FR VCs), the Point-to-Point Protocol (PPP) across the Layer 2 Tunneling Protocol (L2TP), and IP security protocol (IPsec). ATM or frame relay virtual circuits may be delivered to a customer using Digital Subscriber Line (DSL) access. However, it will be evident to one of skill in the art that other tunneling protocols may be used to implement the tunnels of the present invention.

Figure 11:
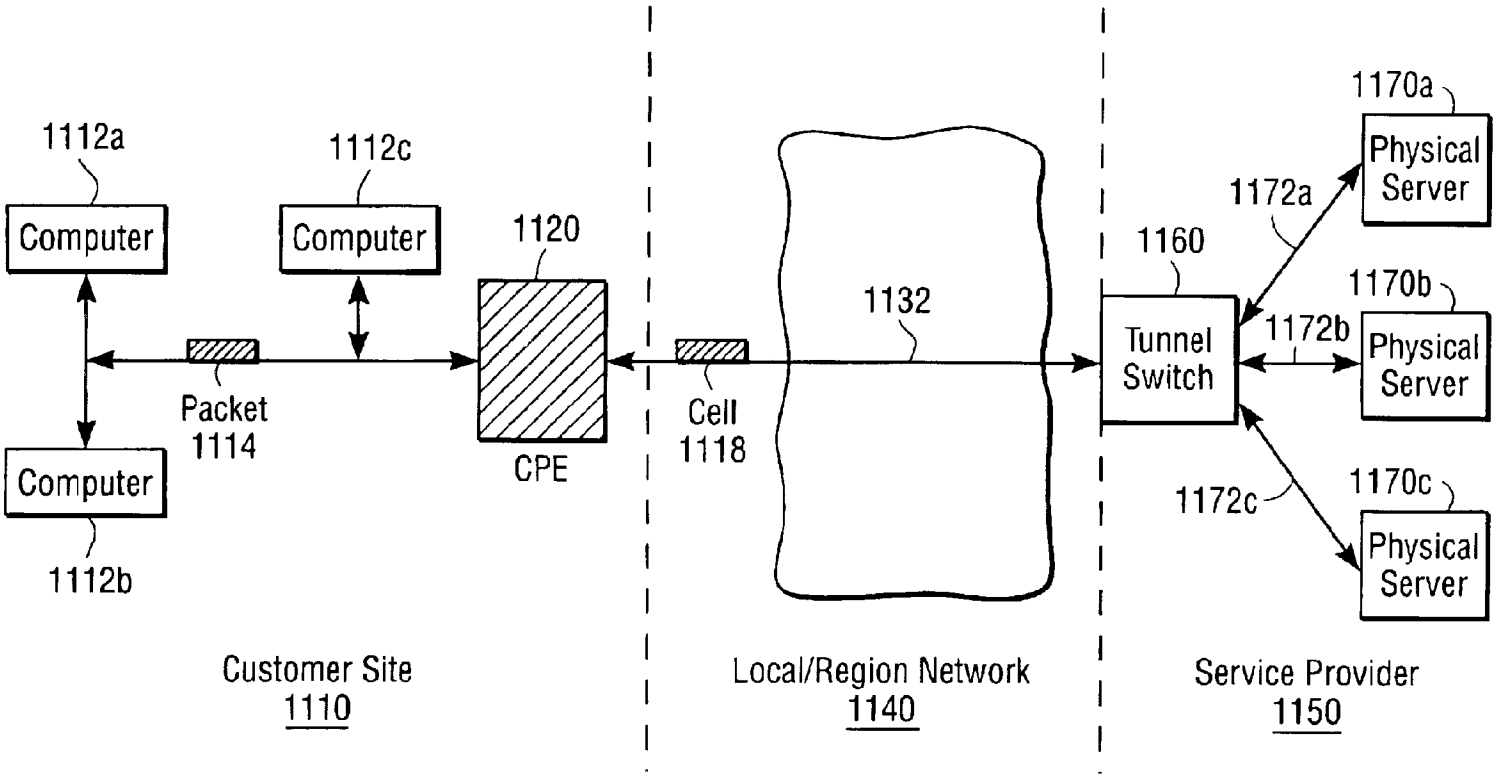
FIG. 11 is an illustration of an embodiment of a private virtual server system using Asynchronous Transfer Mode (ATM) layer two tunneling.

FIG. 11 is an illustration of an embodiment of a private virtual server system using ATM layer 2 tunneling with DSL access. A system 1100 spans a customer site 1110, a local or regional network 1140, and a service provider 1150.

The customer site 1110 contains a group of computers 1112A, 1112B, and 1112C. The computers 1112 are representative of the customer's on-site private network. Such a private network could be comprised of more or fewer individual computers, as well as other types of equipment such as storage devices.

Components within a customer's on-site private network communicate using a private IP addressing scheme. A packet 1114 is a privately-addressed transmission sent using the local IP protocol of the customer site 1110. Packet 1114 is sent from customer 1110 to customer 1110's private virtual server. Packet 1114 has a destination address corresponding to a private virtual server of service provider 1150.

The on-site private network of devices 1112 is connected to a customer premise equipment box (CPE) 1120. Packet 114 is routed to CPE 1120. The CPE connects the customer site 1110 to a tunnel 1132, established between the customer site 1110 and the service provider site 1150. The tunnel functions as a bi-directional data pipe, and is typically established when a customer subscribes to a service provider providing a tunneling service. A fixed ATM tunnel is referred to as a permanent virtual circuit. The CPE divides the data of packet 1114 into cells (or packets) of a fixed size designated by the ATM protocol, and encapsulates them with a Virtual Channel Identifier (VCI) used to direct the cells through the data pipe. An ATM cell 1118 is created from the division and encapsulation of packet 1114.

Tunnel 1132 terminates at a tunnel switch 1160 of the service provider 1150. Tunnel switch 1160 is connected via a set of bi-directional ATM tunnels 1172 to a set of physical servers 1170. In another embodiment, two sets of unidirectional tunnels are used to provide a two-way connection between customer site 1110 and service provider 1150.

Figure 12:
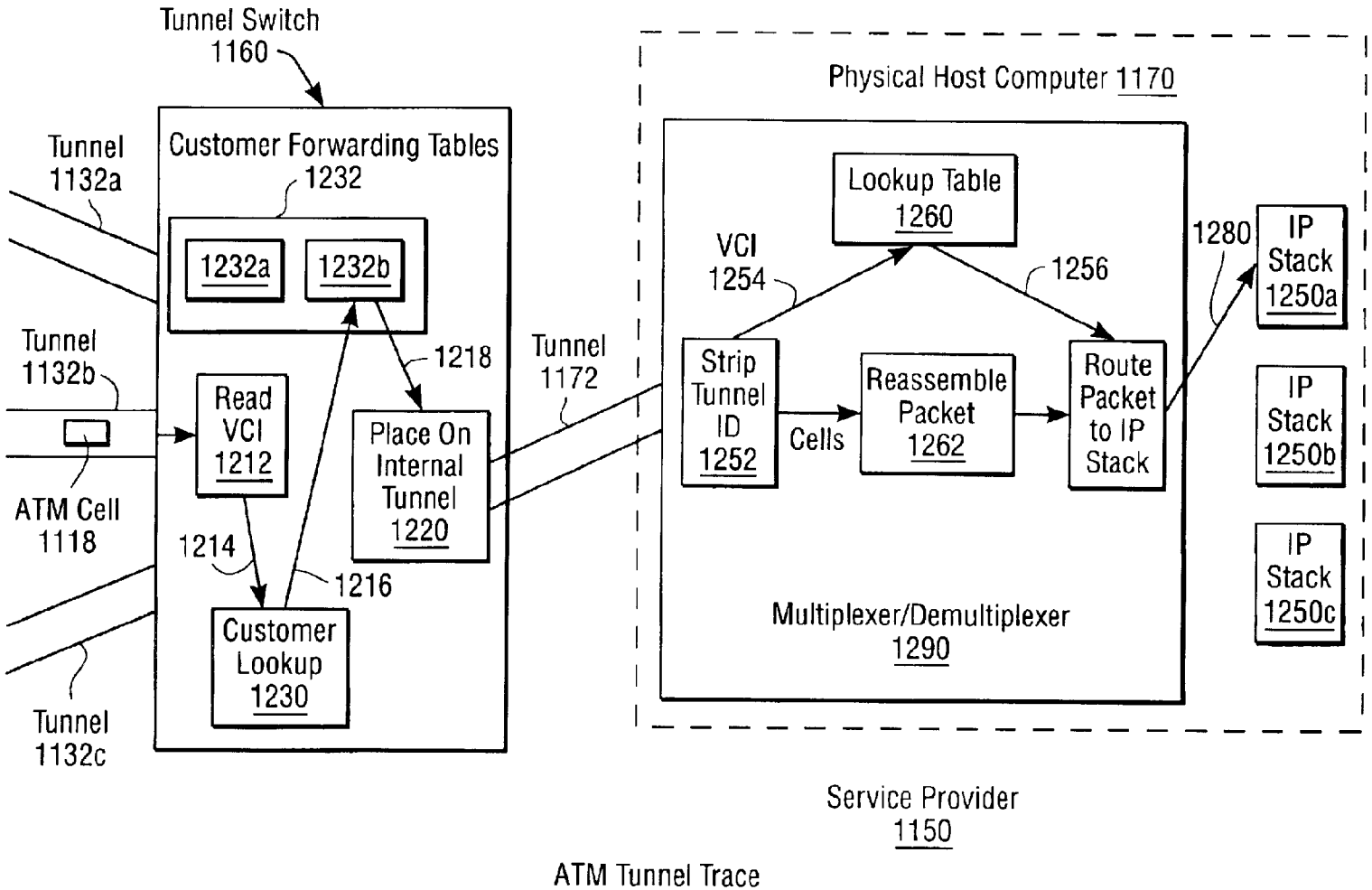
FIG. 12 is a block diagram illustrating the traffic flow of an ATM cell from a tunnel to a private virtual server.

FIG. 12 shows an embodiment of the traffic flow of an ATM cell from a tunnel to a private virtual server. The system of FIG. 12 presents in more detail the functions of the service provider data service center 1150 shown in FIG. 11. In FIG. 12, the service provider data service center 1150 contains the tunnel switch 1160 and a physical host computer 1170. It is to be understood that more than one physical host computer 1170 may be included in system 1150.

A set of incoming external tunnels 1132 terminates at the tunnel switch 1160. Tunnel 1132B carries the incoming ATM cell 1118. Referring back to FIG. 11, ATM cell 1118 is created by the ATM CPE 1120 on the customer site 1110. ATM cell 1118 is created from a privately-addressed IP packet 1114 originally sent by one of the computers 1112.

In FIG. 12, the VCI identifying the incoming tunnel of ATM cell 1118 is read 1212, and presented 1214 to a customer lookup table 1230. Customer lookup table 1230 returns 1216 the correct customer forwarding table (1232B). Table 1232B is accessed from a set of customer forwarding tables 1232.

Customer forwarding table 1232B returns 1218 the identity of the outgoing tunnel required to reach the correct private virtual server destination (1250A) for ATM cell 1118. ATM cell 1118 is then placed 1220 on an internal tunnel 1172 to reach the private virtual server 1250A. Internal tunnel 1172 terminates at a multiplexing/demultiplexing mechanism 1290 of the physical host computer 1170, which contains private virtual server 1250A.

The VCI of ATM cell 1118 is stripped 1252, and the VCI is presented 1254 to lookup table 1260. The rest of the ATM cell 1118, including the original source/destination addresses and payload, is held until the original IP packet 1114 sent by a customer 1112 can be reassembled. The ATM protocol uses relatively small cells compared to other transmission protocols. Therefore multiple ATM cells may be required to reassemble the original pre-ATM-encapsulation packet 1114.

Once the original IP packet 1114 has been reassembled 1262, the location of the IP stack of the destination private virtual server 1250A is retrieved 1256 from lookup table 1260. Packet 1114 is routed 1280 to the IP stack of private virtual server 1250A.

Although the invention has been described in considerable detail with reference to certain embodiments, other embodiments are possible. As will be understood by those of skill in the art, the invention may be embodied in other specific forms without departing from the essential characteristics thereof For example, different protocols may be used to create tunnels. Accordingly, the present invention is intended to embrace all such alternatives, modifications and variations as fall within the spirit and scope of the appended claims and equivalents.

We claim:

1. In a system comprising a host computer containing a plurality of virtual servers which support a private network address space wherein the private network address spaces of two or more of the virtual servers overlap, a method for providing private network services using private addresses in a location remote from private network users, the method comprising:

storing a customer lookup table, the customer lookup table storing associations between physical interfaces and tunnel identifiers identifying tunnels for private networks and a plurality of customer forwarding tables;

storing a plurality of customer forwarding tables, the customer forwarding tables associating network addresses with physical interfaces and tunnel identifiers;

receiving, over a tunnel, a transmission on a physical interface, the transmission containing a tunnel identifier;

determining the correct customer forwarding table from the customer lookup table using the physical interface and the tunnel identifier;

determining via the customer forwarding table a physical interface and tunnel identifier associated with a network address of the transmission; and sending the transmission to the network address on the determined physical interface using the determined tunnel identifier.

2. A computer-readable medium containing a computer program product for providing private network services using private addresses in a location remote from private network users, wherein a host computer contain a plurality of virtual servers which support a private network address space and wherein the private network address spaces of two or more of the virtual servers overlap, the computer program product, *when executed by a computing system, implements a process* comprising:

[program instructions for] storing a customer lookup table, the customer lookup table storing associations between physical interfaces and tunnel identifiers identifying tunnels for private networks and a plurality of customer forwarding tables;

[program instructions for] storing a plurality of customer forwarding tables, the customer forwarding tables associating network addresses with physical interfaces and tunnel identifiers;

[program instructions for] receiving, over a tunnel, a transmission on a physical interface, the transmission containing a tunnel identifier;

[program instructions for] determining the correct customer forwarding table from the customer lookup table using the physical interface and the tunnel identifier;

[program instructions for] determining via the customer forwarding table a physical interface and tunnel identifier associated with a network address of the transmission; and

[program instructions for] sending the transmission to the network address on the determined physical interface using the determined tunnel identifier.

*3. In a system comprising a host computer containing multiple virtual servers that each support a private network address space wherein the private network address spaces of two or more of the virtual servers overlap, a method for providing private network services using private addresses in a location remote from private network users, the method comprising:*

*storing customer lookup information and customer forwarding information, the customer lookup information specifying associations between physical interfaces and tunnel identifiers identifying tunnels for private networks and multiple customer forwarding tables, the customer forwarding information associating network addresses with physical interfaces and tunnel identifiers;*

*receiving, over a tunnel, a transmission on a physical interface having an interface identifier, the transmission identifying a tunnel identifier;*

*determining the correct customer forwarding information from the customer lookup information using the physical interface identifier and the tunnel identifier;*

*using the customer forwarding information to identify a physical interface and tunnel identifier associated with a network address of the transmission; and*

*sending the transmission to the network address on the identified physical interface using the identified tunnel identifier.*

*4. The method of claim 3, further comprising receiving the transmission via the tunnel from a private network.*

*5. The method of claim 3, further comprising routing the transmission over a layer 2 tunnel.*

*6. The method of claim 3, wherein routing the transmission to a virtual server comprises:*

*terminating an incoming tunnel containing a transmission; and*

*multiplexing the transmission to a virtual server.*

*7. The method of claim 6, further comprising:*

*identifying the tunnel identifier contained in the transmission; and*

*selecting a virtual server based upon the identified tunnel identifier.*

*8. The method of claim 6, wherein routing the transmission to a virtual server comprises:*

*terminating an incoming tunnel containing the transmission;*

*switching the transmission to a tunnel connected to a physical host computer containing a private network's virtual server;*

*terminating the tunnel at the physical host computer; and multiplexing the transmission to the virtual server.*

* * * * *

UNITED STATES PATENT AND TRADEMARK OFFICE

CERTIFICATE OF CORRECTION

PATENT NO. : RE43,051 E
APPLICATION NO. : 11/858091
DATED : December 27, 2011
INVENTOR(S) : Newman et al.

It is certified that error appears in the above-identified patent and that said Letters Patent is hereby corrected as shown below:

Column 2, line 41, insert --.-- after "network"

Column 2, line 65, insert --as-- before "it is"

Column 2, line 66, insert --the-- before "beneficial"

Column 6, line 59, delete "direct" and insert --directs--

Column 12, line 45, delete "customer I" and insert --customer 1--

Column 15, line 50, claim 2, delete "contain" and insert --contains--

Column 16, line 25, claim 3, delete "tables" and insert --information--

Signed and Sealed this
Thirteenth Day of March, 2012

David J. Kappos
*Director of the United States Patent and Trademark Office*